(12) United States Patent
Ricci et al.

(10) Patent No.: US 11,738,875 B2
(45) Date of Patent: Aug. 29, 2023

(54) LIGHTWEIGHT, HIGH-EFFICIENCY, ENERGY-DENSE, HYBRID POWER SYSTEM FOR RELIABLE ELECTRIC FLIGHT

(71) Applicant: LaunchPoint Electric Propulsion Solutions, Inc., Goleta, CA (US)

(72) Inventors: Michael R. Ricci, Camarillo, CA (US); David B. Paden, Goleta, CA (US); Vishaal Varahamurthy, Santa Barbara, CA (US); Brian J. Clark, Santa Barbara, CA (US); Bradley E. Paden, Goleta, CA (US)

(73) Assignee: Launch Point Electric Propulsion Solutions, Inc., Goleta, CA (US)

( * ) Notice: Subject to any disclaimer, the term of this patent is extended or adjusted under 35 U.S.C. 154(b) by 208 days.

(21) Appl. No.: 17/209,900

(22) Filed: Mar. 23, 2021

(65) Prior Publication Data
US 2022/0185490 A1 Jun. 16, 2022

Related U.S. Application Data

(60) Provisional application No. 63/124,236, filed on Dec. 11, 2020.

(51) Int. Cl.
*H02P 1/00* (2006.01)
*B64D 27/24* (2006.01)
*B64D 31/14* (2006.01)
*B64D 31/06* (2006.01)
*B64C 29/00* (2006.01)
*B60L 50/61* (2019.01)
(Continued)

(52) U.S. Cl.
CPC .............. *B64D 27/24* (2013.01); *B60L 50/13* (2019.02); *B60L 50/51* (2019.02); *B60L 50/61* (2019.02); *B64C 29/0033* (2013.01); *B64D 31/06* (2013.01); *B64D 31/14* (2013.01); *H02P 9/04* (2013.01); *H02P 21/24* (2016.02); *B60L 2200/10* (2013.01); *B60L 2220/14* (2013.01); *B60L 2220/42* (2013.01); *B60L 2240/421* (2013.01); *B60L 2240/427* (2013.01); *B64D 2027/026* (2013.01); *B64D 2221/00* (2013.01)

(58) Field of Classification Search
CPC ........... H02P 21/24; H02P 9/04; B64D 31/06; B64D 27/24; B64D 2027/026; B60L 50/61; B60L 50/13; B60L 50/51; B60L 2200/10; B60L 2220/14; B60L 2220/42; B60L 2240/421; B60L 2240/427
See application file for complete search history.

(56) References Cited

FOREIGN PATENT DOCUMENTS

CN  111641250 A  *  9/2020  .......... B60L 15/2045

* cited by examiner

*Primary Examiner* — Karen Masih
(74) *Attorney, Agent, or Firm* — Felix L. Fischer

(57) ABSTRACT

Lightweight, energy-dense, high-efficiency, hybrid power systems for electric aircraft including a prime mover internal combustion engine or gas turbine coupled to a self-cooling polyphase axial-flux dual-Halbach-array motor/alternator where the number of phases $N_{phase}$ is greater than or equal to three. The motor/alternator is connected to a regenerative power converter drive also having $N_{phase}$ phases, which, in turn, is connected to a DC power bus, a battery, a battery management system, and a system controller. In some embodiments, the motor/alternator and regenerative power converter drive have a neutral connection.

20 Claims, 26 Drawing Sheets

(51) Int. Cl.
*B60L 50/51* (2019.01)
*B60L 50/13* (2019.01)
*H02P 9/04* (2006.01)
*H02P 21/24* (2016.01)
*B64D 27/02* (2006.01)

*Bus Power Calculation*

*Throttle Control Loop*

LIGHTWEIGHT, HIGH-EFFICIENCY, ENERGY-DENSE, HYBRID POWER SYSTEM FOR RELIABLE ELECTRIC FLIGHT

REFERENCES TO RELATED APPLICATIONS

This application claims priority from U.S. provisional application Ser. No. 63/124,236 filed on Dec. 11, 2020 entitled LIGHTWEIGHT, HIGH EFFICIENCY, ENERGY DENSE HYBRID POWER SYSTEM FOR RELIABLE ELECTRIC FLIGHT, the disclosure of which is incorporated herein by reference.

BACKGROUND

Field

The implementations disclosed herein relate to power sources for electrically propelled urban air mobility (UAM) vehicles and unmanned aerial vehicles (UAVs) that are energy dense, power dense, efficient, reliable, and that provide power to electric motors that drive rotors and propellers that provide lift and/or thrust with bus voltage that is insensitive to bus current, and the bus has low voltage and current ripple. More particularly, an engine or other prime mover is configured to power a motor/alternator, and a regenerative power converter drive ("regenerative drive") is coupled to the motor/alternator to convert mechanical power into electrical power on the vehicle power bus. The regenerative drive also works in reverse and powers the motor/alternator to start the engine.

Related Art

Electric propulsion is exciting for aircraft because electric motors can have much higher power/kg than piston engines or turbine engines, and they scale up and down more easily than such thermal engines. This means that electrically powered propulsion units can be placed in aerodynamically favorable locations such as at wingtips or the ends of "arms" on multirotor aircraft (often called "distributed electric propulsion" in the industry). However, relative to conventional liquid fuels, electric energy storage (batteries) is heavy and bulky. This means that for any long duration flight (which requires a lot of energy), the electric propulsion concept is unsuitable due to the weight and bulk of the batteries.

Prior art hybrid electric propulsion has been used to convert highly energy dense liquid fuels into electric energy so that "distributed electric propulsion" can be combined with energy dense liquid fuel energy storage. In such systems a turbine or piston internal combustion engine ("ICE") converts liquid fuel to mechanical energy, which is then converted to electric energy via a motor/alternator and power electronics. However, the mass and to a lesser degree the efficiency of the engine and generator and electronics in the energy conversion chain can make the system so heavy that there is no payload capacity left on the vehicle to carry enough fuel to fly for very long.

Additionally, as those skilled in the art will appreciate, as motor/alternators and power electronics are made smaller and lighter, their thermal mass and surface area go down, and removing waste heat from them becomes a limiting challenge. These components process a lot of power, and even 5% or 2% losses can quickly overheat a small, high powered motor/alternator. Typical prior art solutions to cooling include bolting on large heat sinks and cooling fins and placing the system in high velocity air flow to remove waste heat. In some prior art systems, the thermal management for the motor and the power electronics can be almost 50% of the mass of these system. Adding heat sink fins to the motor, and then placing the motor (or generator) in a high velocity airflow adds "cooling drag" to the aircraft, which again increases aircraft power and energy demands, and fuel weight further reducing energy density, lifting capacity, and range.

It is therefore desirable to overcome these limitations in the art.

SUMMARY OF THE INVENTION

The implementations herein provide lightweight, energy-dense, high-efficiency hybrid power systems for electric aircraft having a prime mover coupled to a self-cooling polyphase axial-flux dual-Halbach-array motor/alternator with $N_{phase}$ phases connected to a polyphase regenerative drive with $N_{phase}$ phases connected to a DC power bus. A battery is connected to the DC power bus. A battery management system is operably connected to the battery. A system controller is operably connected to the prime mover, the battery management system, and the polyphase regenerative drive.

In example implementations the prime mover is an internal combustion engine or a gas turbine.

In further example implementations $N_{phase}$ is greater than or equal to 3.

In alternative example implementations $N_{phase}$ is greater than or equal to 6.

A further understanding of the disclosed implementation is provided by the following Detailed Description taken in combination with the associated Figures.

DETAILED DESCRIPTION OF THE INVENTION

Figure 1A:
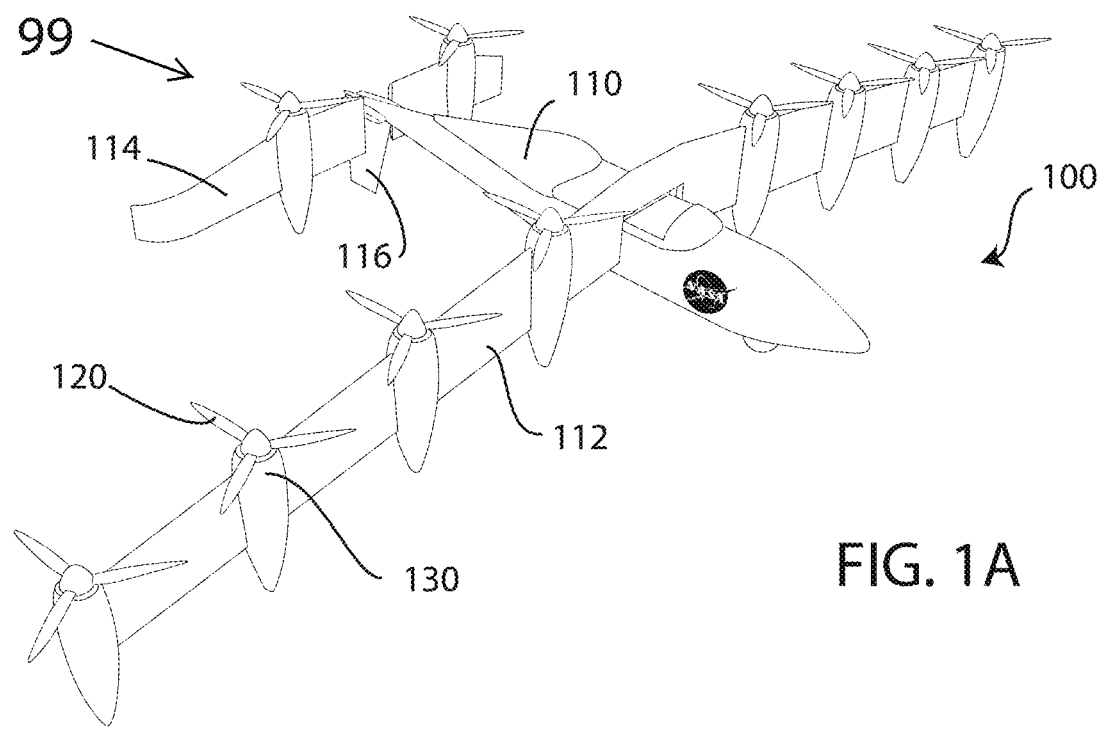
FIG. 1A is a representation of an air vehicle employing the presently disclosed implementations configured for take-off and hovering.
Figure 1B:
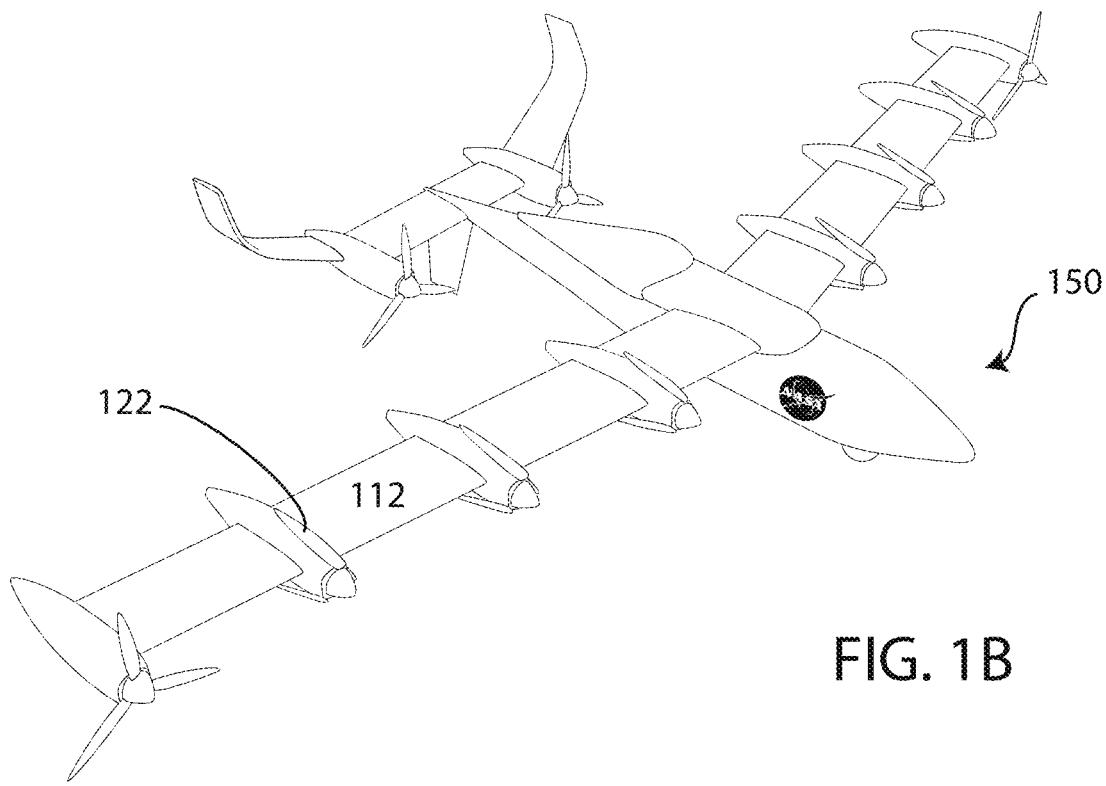
FIG. 1B is a representation of the air vehicle employing the presently disclosed implementations configured for cruise flight.

The implementations disclosed herein provide enhanced reliability, lightweight, low-volume, energy-dense, high-efficiency, hybrid power systems for electric aircraft that, in a broad aspect, include a "prime mover" (internal combustion engine or gas turbine) coupled to a self-cooling polyphase axial-flux dual-Halbach-array electric motor/alternator where the number of phases $N_{phase}$ is greater than or equal to three. The motor/alternator is connected to a regenerative drive having $N_{phase}$ phases, which, in turn, is connected to a DC power bus, a battery, a battery management system, and a system controller.

More specifically, the dual Halbach array motor/alternator attached to the prime mover in the example implementation cools itself via air entrained in the rotor stator gap and centrifugally pumped through the motor/alternator and over the winding. Thus, the prime mover can be mounted inside the vehicle and the motor/alternator cools itself through the entrained air. Only a low drag "NACA" inlet needs to be provided on the aircraft exterior to ensure air exchange to the interior volume to exhaust the waste heat. Because the high velocity airflow required to get good convection and cooling is provided by the motor/alternator as part of its operation, no additional heat sinks, or cooling fins or water jacket and heat exchangers are required.

Also, the disclosed implementation lends itself well to integration with a piston engine as the implementation of the ICE. Piston engines have large torque pulses on the power strokes, often a large (heavy) flywheel is added to the engine to smooth out the output torque. In an aircraft, heavy flywheels are not an option, so anything attached to the engine output must be able to withstand the power stroke torque variation. The peak torque from a piston engine can be 15 times the average torque output of the engine. This means the motor/alternator structure torsional strength must be over-designed by 15 times from the nominal average power output torque requirement. The axial flux machine disclosed herein includes an essentially a flat disc which is extremely strong in torsion and hence there is essentially no weight penalty to have enough strength to handle the engine power stroke pulses.

Aircraft also have much higher reliability requirements than automobiles. An automobile engine can fail, and the driver can simply pull over to the side of the road. An aircraft does not have this option and ends up landing in a field. And an electric VTOL aircraft in hover will instantly plummet directly to the ground if power fails while in a "powered lift" mode of flight, most of these aircraft cannot "auto-rotate" the way a helicopter can (and a helicopter needs forward speed to autorotate, so any truly vertical flight path is extremely exposed to risk from power failure). The preferred dual 3-phase (or 6-phase) configuration used in the example axial-flux motor/alternator provides a level of redundancy. If one winding fails, the other windings can still provide power, albeit at a reduced rating from the full 6-phase motor/alternator. In the event of a failure in one of the 3-phase windings the aircraft can still have enough power available to land safely, although with decreased excess power available and a decreased flight envelope.

The same redundancy applies to the power electronics, which may present a reliability challenge due to the large number of components and complexity. For example, where $N_{phase}$ equals 6, the 6-phase electronics are constructed as two independent 3-phase systems. Thus, a failure on one of the 3-phase systems does not preclude the other system from continuing to function and providing partial power to the aircraft.

6-phases (12 pulses following rectification) means that the ripple currents inherent in converting between an AC alternator and a DC bus are reduced over more conventional 3-phase (6-pulse) power conversion. The reduced ripple currents allow smaller (and importantly lighter) bus capacitors to be used (bus capacitors can be 25% of the weight of the power conversion electronics) and also power filtering for the DC bus is significantly reduced, which is another significant source of mass in the power conversion system.

12-pulse conversion is known in the aircraft industry, but it is typically achieved by using a 3-phase alternator (typically a field wound machine, not a permanent magnet machine as employed in the example implementations) connected to a heavy "transformer rectifier unit" ("TRU") that features a phase transformer (heavy electrical steel and copper) that has wye and delta windings on the transformer that creates a second set of three phases that are phase shifted from the original 3-phases—creating a "6-phase" output that is then rectified. This conversion in the aircraft industry is also only unidirectional in the power generation direction, it is not bi-directional as the example implementations where the motor/alternator is also used as a motor for starting. The axial flux winding design allows all 6 phases to be created directly from the motor/alternator without any electromagnetic design penalty. Other, more conventional motor/alternators incur a significant penalty in the selection of poles/teeth/slot combinations to create a 6-phase output directly from the motor/alternator.

As a result, the example implementations provide enhanced reliability and safety while greatly increasing aircraft range and capacity.

Complex system designs such as hybrid power plants for electric aircraft respond to a range of system requirements and the implementations disclosed meet the needs of system requirements with innovative arrangements of component features and component innovations. Various combinations of component features and combinations are optimal depending on the vehicle's mission. Hovering-only aircraft require a relatively consistent average power level during all flight phases, whereas transitioning vehicles that change from hovering to fixed wing flight can have continuous power requirements that vary over a range of four or more. Hovering aircraft may have only a small battery pack for an "electric fuel reserve" to land safely if there is prime mover failure, and the pack stays mostly fully charged during flight. Transitioning aircraft may have a larger pack used to support high continuous power during the take-off and hover portions of the flight, and the pack may be deeply discharged during a full-length hover flight phase.

Hovering vehicles likely operate the prime mover at near peak continuous power and maximum rotational speed at all times to achieve the best power density, whereas transitioning vehicles likely operate the prime mover at a lower power and reduced rotational speed to achieve the best fuel efficiency from the prime mover at certain times such a cruise. Key system requirements that appear repeatedly in hybrid power plant design are requirements for energy density, power density, efficiency, reliability, and power quality (constant bus voltage, and low current and voltage ripple). Energy density is a key feature for long-range missions as energy must be delivered over a relatively long period of time while the vehicle weight is minimized. Hybrid power plants provide energy density by using liquid fuel as the primary source of energy. Power density is a key feature required for take-off and emergency maneuvers where peak power must be delivered while weight is minimized. Hybrid power plants provide power density through the inclusion of batteries that can store up electric energy and deliver it in a short amount of time during take-off.

Efficiency is important as it contributes to energy density and power density. Efficiency is also important for minimizing thermal stress on components as inefficiencies in components result in heat that must be transferred out of the vehicle with cooling systems that contribute mass. Reliability is an essential feature as loss of power can result in loss of lives, cargo, and vehicle that is not acceptable. Power quality contributes to reliable control of the vehicle propulsion systems in that thrust commands are followed. Further, noise and disturbances in the power bus can cause faults in susceptible components.

FIG. 1A depicts an exemplary prior art aircraft like the NASA GL-10 electric vertical take-off and landing (eVTOL) aircraft 99. The GL-10 is a transitioning eVTOL having a take-off and hovering configuration 100 and a cruise configuration 150 shown in FIG. 16. Depicted in FIG. 1A are lift rotors/propellers such as 120 and nacelles 130 containing electric motors that drive the rotor/propellers. There is a total of ten rotor/propellers in the GL-10. Fuselage 110 is connected to wing 112, horizontal stabilizer 114, and vertical stabilizer 116. The wing, horizontal stabilizer, and vertical stabilizer are designed primarily for use in the cruise configuration 150. In cruise, six of the ten rotor/propellers are in a stowed configuration like 122. Since fixed wing operation provides lift efficiently, a reduced number of rotor/propellers is needed, and drag is reduced by stowing the unneeded rotor/propellers. The fuselage 110 contains the hybrid electric power plant and one or more passengers, luggage, cargo, and navigation equipment as well as other objects and devices. The implementations disclosed herein are applicable to such electric aircraft and other vehicles and provides electric power thereto. There are numerous forms of electric aircraft such a fixed-wing electric aircraft, transitioning electric aircraft, electric helicopters, quadrotors, and multi-rotors. The disclosed implementation has applications in all types of electric aircraft.

Figure 2A:
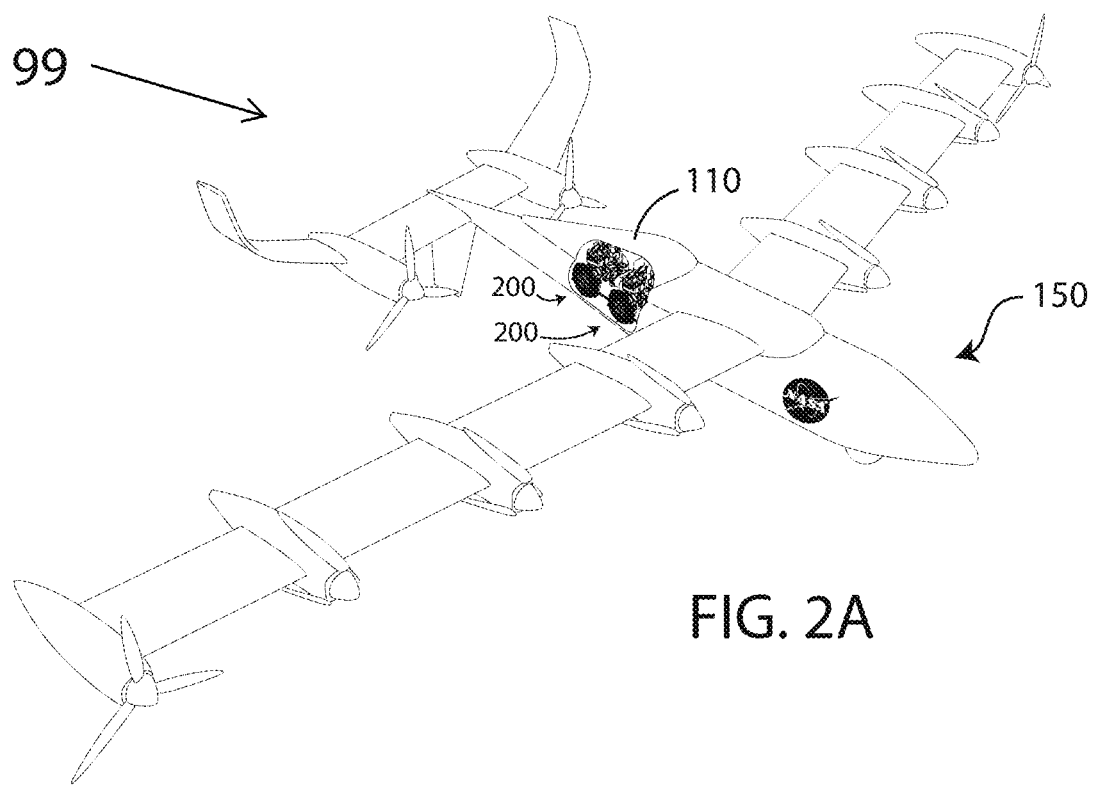
FIG. 2A is a representation of the air vehicle cut away to disclose the exemplary hybrid power systems.
Figure 2B:
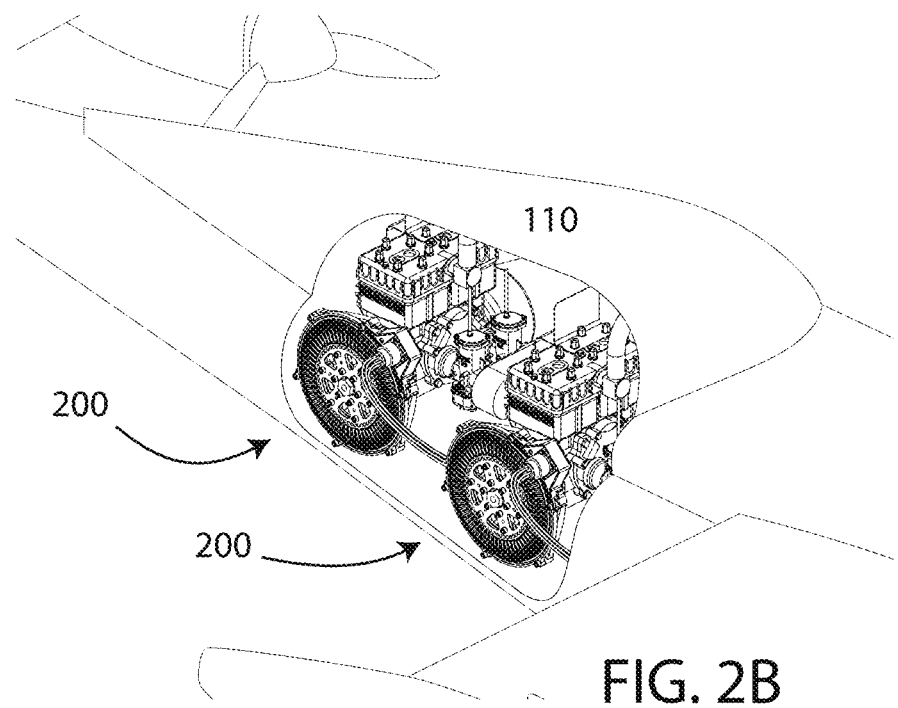
FIG. 2B is a detailed representation of the exemplary hybrid power systems in the air vehicle.

FIGS. 2A and 2b illustrate two exemplary hybrid power systems 200 positioned in the fuselage of the electric aircraft 99 in cruise configuration 150. A lateral orientation of the hybrid power systems 200 is shown in the example and a longitudinal orientation may be applied in alternative configurations. Two hybrid electric power plants in a single vehicle provide additional redundancy and improves safety, though it should be emphasized that a single hybrid power system is sufficient for these purposes.

Figure 3A:
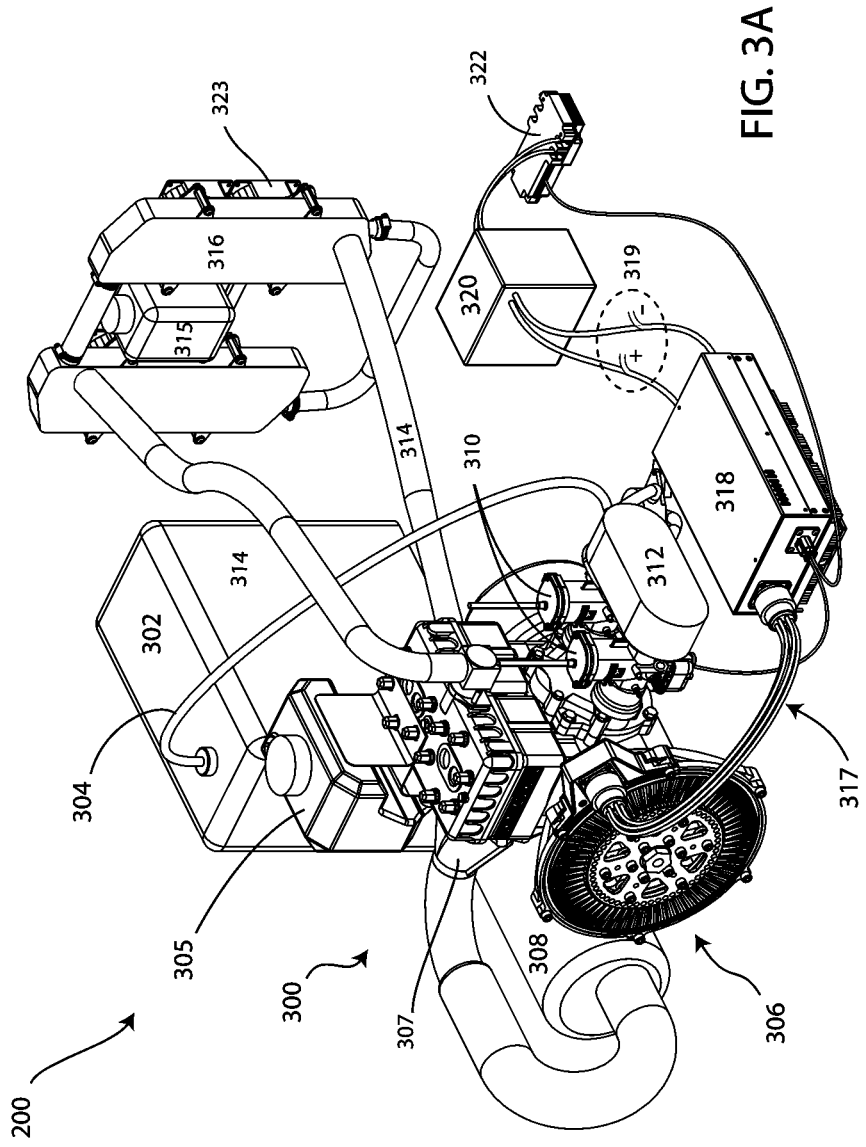
FIG. 3A is an exploded view of the exemplary implementation and its components with a piston engine as the internal combustion engine (ICE)

FIG. 3A shows an exploded view of the exemplary implementation and its components. The relative positions of the components are shown spread out for the purpose of illustration and the components are more tightly packed in an air vehicle. The exemplary components are a prime mover, in the example implementation a liquid-cooled internal combustion engine (ICE) 300, drawing fuel from a fuel tank 302 via a fuel line 304. The embodiment shown is a 2-cylinder 2-stroke piston engine having a separate oil supply 305. A 4-stroke engine or a gas turbine are alternative prime movers for the ICE. A motor/alternator 306 is attached to a crankshaft of the ICE 300. (As used herein, the term motor/alternator is defined as a single electrical machine operable as a motor in a motor mode or an alternator in an alternator mode). The engine exhaust flows through an exhaust manifold 307 to a muffler 308 and then to an engine exhaust that is not visible in the view shown in FIG. 3A. Also shown is an intake air filter 312 and a pair of electronically controlled carburetors 310. Engine coolant flows through pipes 314 and through radiator 316, which transfers waste heat to the ambient air flowing through the radiator due to motion of the vehicle or due to fans 323. Coolant bottle 315 stores coolant that may overflow due to thermal expansion of the coolant in the system.

The prime mover control system for the hybrid power system can be augmented with sensors of various types as is known in the art of prime mover control including sensors for mass flow, cylinder head temperature, intake temperature, coolant temperature, exhaust gas temperature, and combustion chamber pressure, or combustion chamber temperature. The carburetors may be replaced with a fuel injection system in an ICE.

Electric power to/from the motor/alternator 306 passes through terminal connections 317 to an electronics unit 318. Additional signal cables (not shown) can include a signal cable for the shaft angle or electrical angle of the motor/alternator 306. The electronics unit 318 contains regenerative drive electronics to manage the power flow to/from the motor/alternator and the system controller. The electronics unit 318 is connected to a DC bus 319, which, in turn, is connected to a battery 320 and to the propulsion motors contained in nacelles 130 shown in FIG. 1A. A battery management system (BMS) 322 is connected to the battery 320.

Figure 3B:
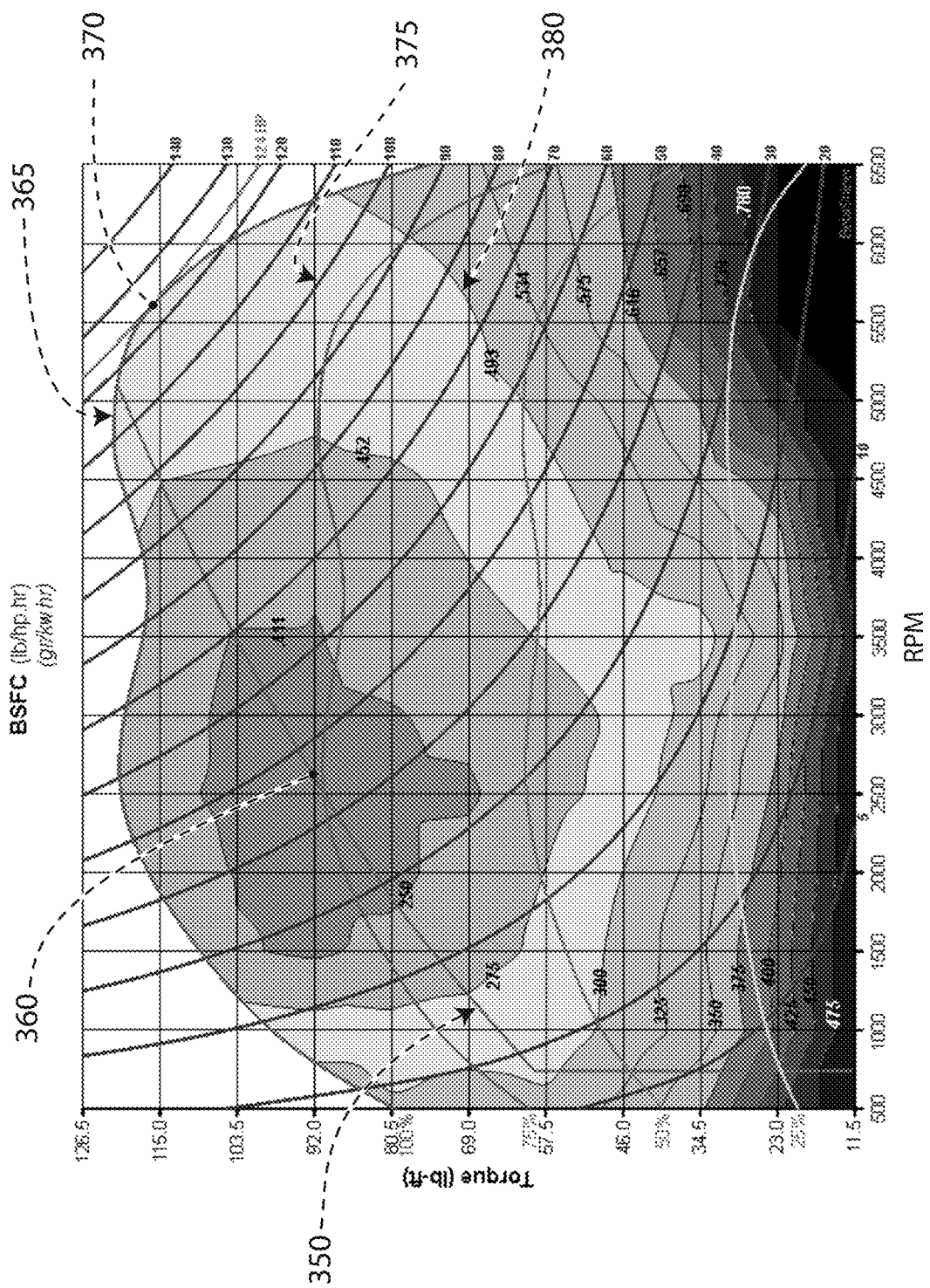
FIG. 3B is a graphical representation of exemplary performance curves for a 4-stroke embodiment of the ICE.

FIG. 3B shows exemplary performance curves for a 4-stroke piston embodiment of the ICE 300. Similar performance curves exist for 2-stroke and gas turbine engines. Peak fuel efficiency curve 350 defines the best operating torque at each engine speed. A peak fuel efficiency point 360 is the optimal over all engine speeds and gives the minimum brake-specific fuel consumption (BSFC) frequently measured in units of lb/hp-hr or gm/kW-hr. FIG. 3B also shows torque vs. speed curves for various throttle angles including the curve 365 for wide-open throttle (WOT). A peak power point 370 occurs on the WOT curve. Also shown are constant power curves such as the 100 hp curve 375 and constant fuel consumption curves such at the 0.493 lb/hp-hr (300 gm/kW-hr) curve 380. These curves are important for determine optimum prime mover control for both efficiency and power output.

Figures 4A, 4B:
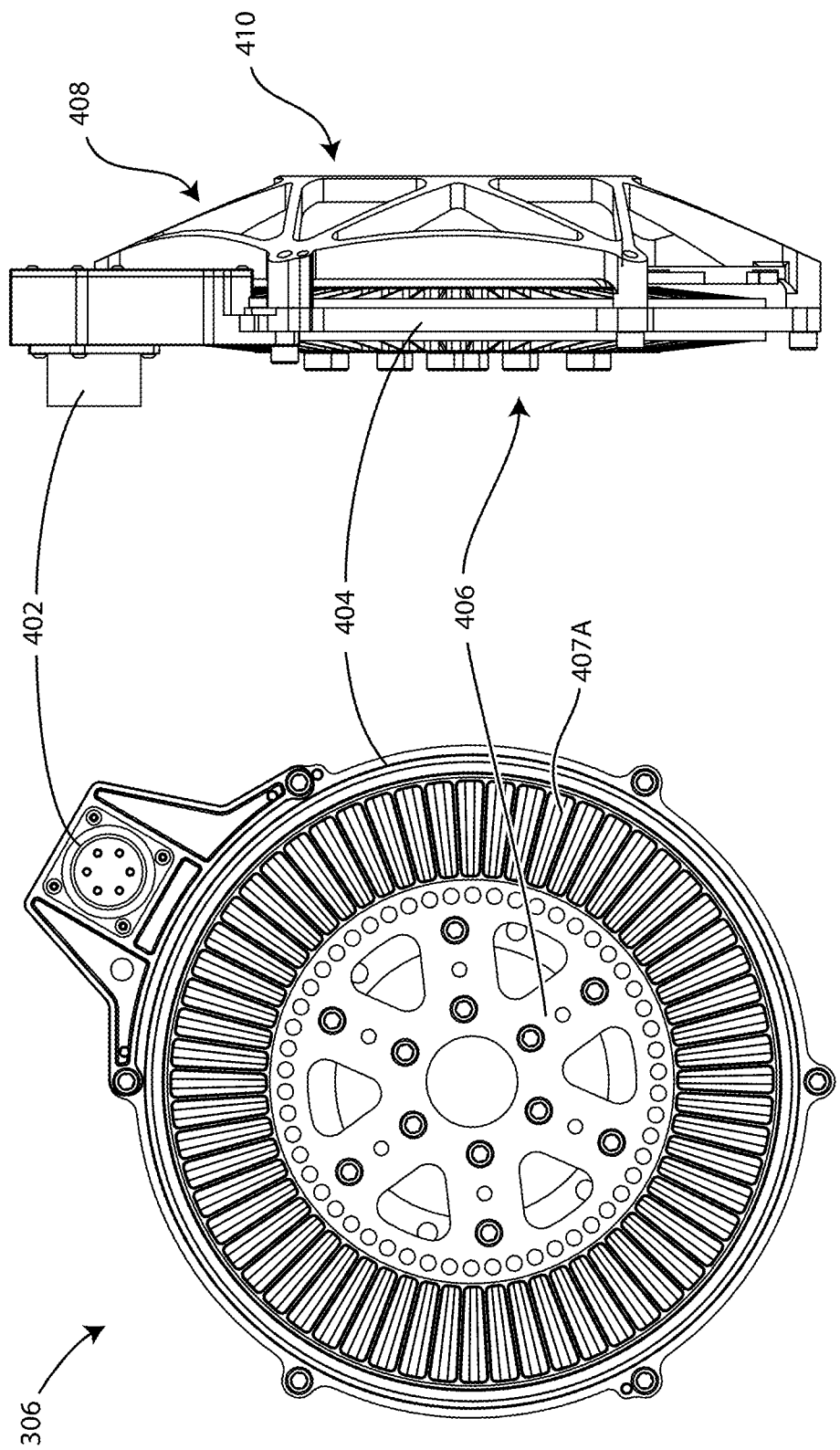
FIGS. 4A and 4B are front and side views of the polyphase dual-Halbach-array axial-gap motor/alternator.

FIGS. 4A and 4B illustrate an exemplary motor/alternator 306 of the disclosed implementation that is a polyphase dual-Halbach-array axial-gap motor/alternator. This motor/alternator is ironless and eliminates hysteresis and eddy-current losses that occur in iron-core motor/alternators and is thus suitable for high-speed power-dense applications. The construction of such motor/alternators and their components are described in U.S. Pat. Nos. 10,574,110 and 10,141,822, the disclosures of which are included herein by reference in their entirety. Stator ring 404 attaches to the stator winding 500 (visible in FIG. 5). The front motor rotor 406 is made of titanium or other non-magnetic structure material and supports front rotor magnets 407A forming a Halbach array. In the embodiment shown there are six magnets per magnetic cycle, equivalently six magnets per pole pair or three magnets per pole. For each pole, the three magnets are supported in a pocket in the titanium rotor shown. The number of magnets per cycle can be any integer greater or equal to four and preferably an even integer. A continuously rotating magnetization direction is also possible as described in J Mallinson, "One-sided fluxes—a magnetic curiosity?"; IEEE Transactions on Magnetics, 9(4):678-682, 1973. Advanced magnetization methods are required to achieve continuously rotating magnetization direction. Also shown are a power connector 402, a stator support 408, and a motor/alternator mount 410.

Figure 5:
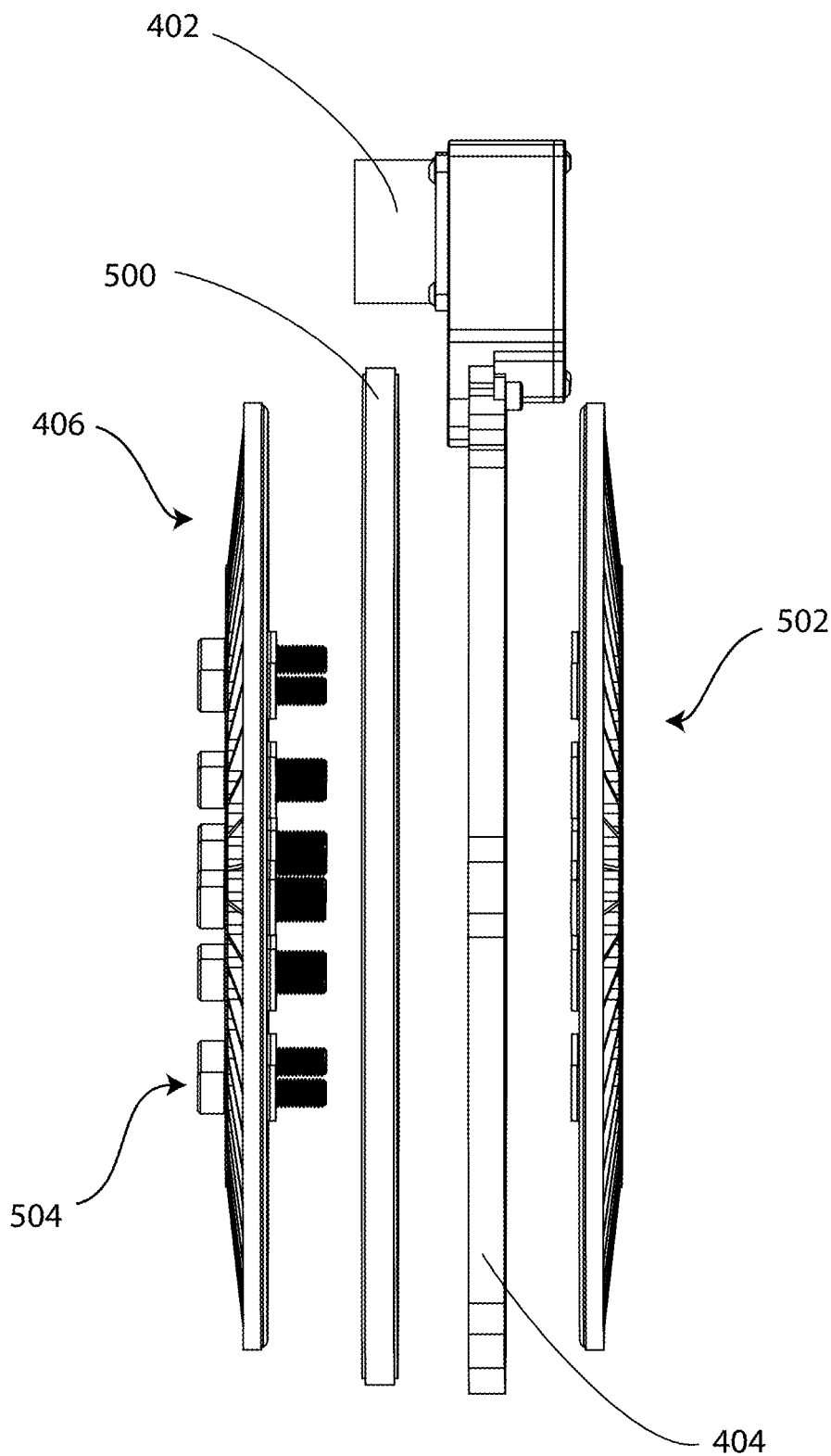
FIG. 5 is a side exploded view of the motor alternator.

FIG. 5 shows additional detail of the motor/alternator 306. Specifically, a back rotor 502 and a self-supporting stator winding 500 that attaches to the stator ring 404. The front and back rotors 406, 502 are bolted together with bolts 504.

Figure 6A:
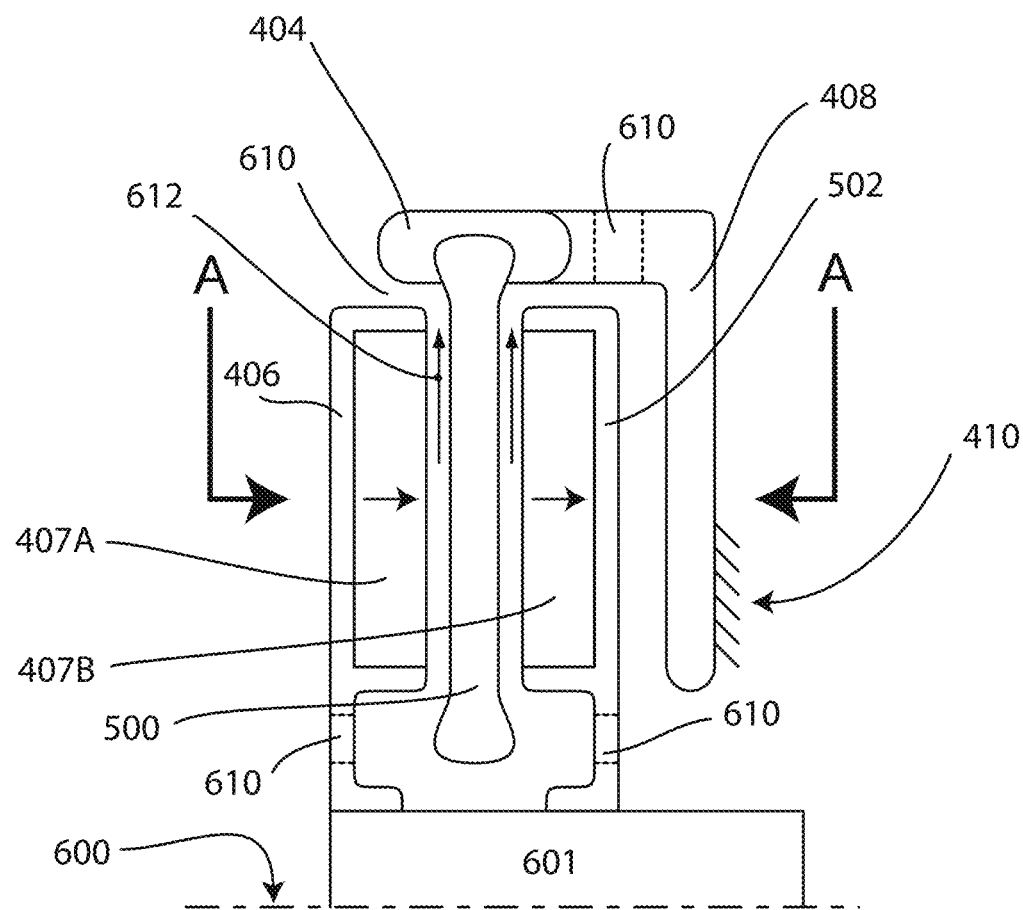
FIG. 6A is a schematic half axial section representation with an axis of symmetry at the center of the motor/alternator shaft (shown with the radial dimension compressed to show the extents of all components)
Figure 6B:
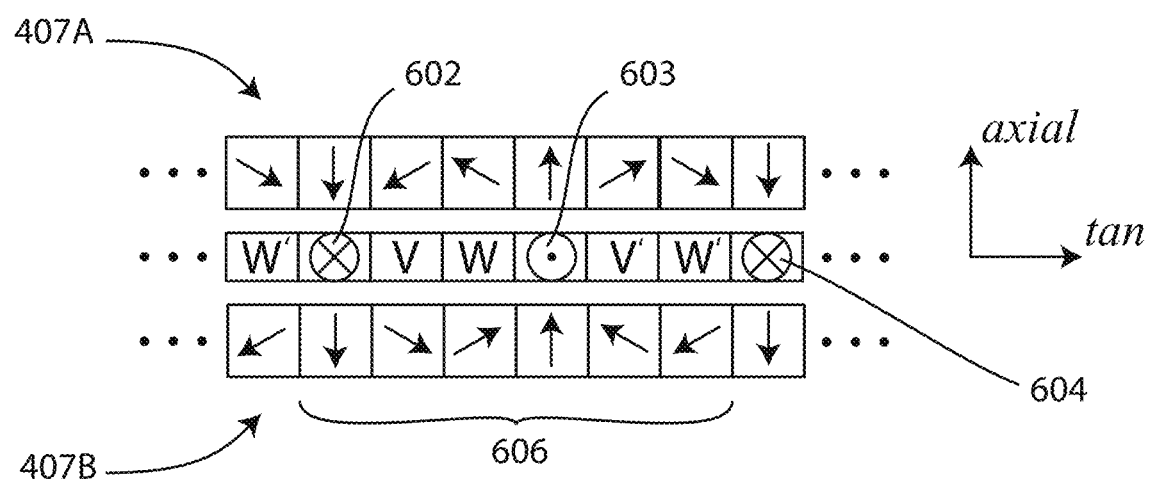
FIG. 6B is a segment of a circumferential section taken at A-A in FIG. 6A with the axial and tangential (tan) directions demonstrated.

FIGS. 6A and 6B provide further detail of the motor/alternator's Halbach arrays 407A and 407B and winding configurations for an exemplary three-phase motor/alternator 306. This is for purposes of illustration and is not intended to limit the claims herein to a polyphase machine to a number of phases $N_{phases}$ equal to three. FIG. 6A is a half axial section symmetrical about an axis 600 at the center of an engine shaft 601. The motor/alternator 306 is self-cooling as it naturally pumps air through cooling ports 610 to create a flow 612 in the axial gap of the motor. Such a cooling system is both light and reliable and contributes to the overall system performance in these regards. FIG. 6B is a segment of a circumferential section taken at A-A in FIG. 6A and the axial and tangential (tan) directions are indicated. The position of the motor rotors in FIG. 6B is such that the axial magnetic field is highest in the phase winding U incorporating conductor segments 602, 603, and 604. Phases V and W are indicated by letter where V' and W' indicate that the positive sense of current flow is out of the page and the unprimed V and W indicate that the positive sense of current flow is into the page. The Halbach arrays focus the field in the gap between the Halbach arrays (front rotor magnets 407A, rear rotor magnets 407B supported in the front motor rotor 406 and rear motor rotor 502, respectively) in a near optimal fashion and contribute to the power density of the overall motor/alternator and hybrid power system. The circle surrounding the "X" at 602 indicates the positive direction of current flow in phase U is into the page and toward the engine shaft 601. The circle surrounding the "•" at 603 indicates that the positive sense of current flow is out of the page in phase U and away from the engine shaft 601. The Halbach arrays, front rotor magnets 407A, rear rotor magnets 407B, in this embodiment have six magnets per cycle 606.

Figure 7A:
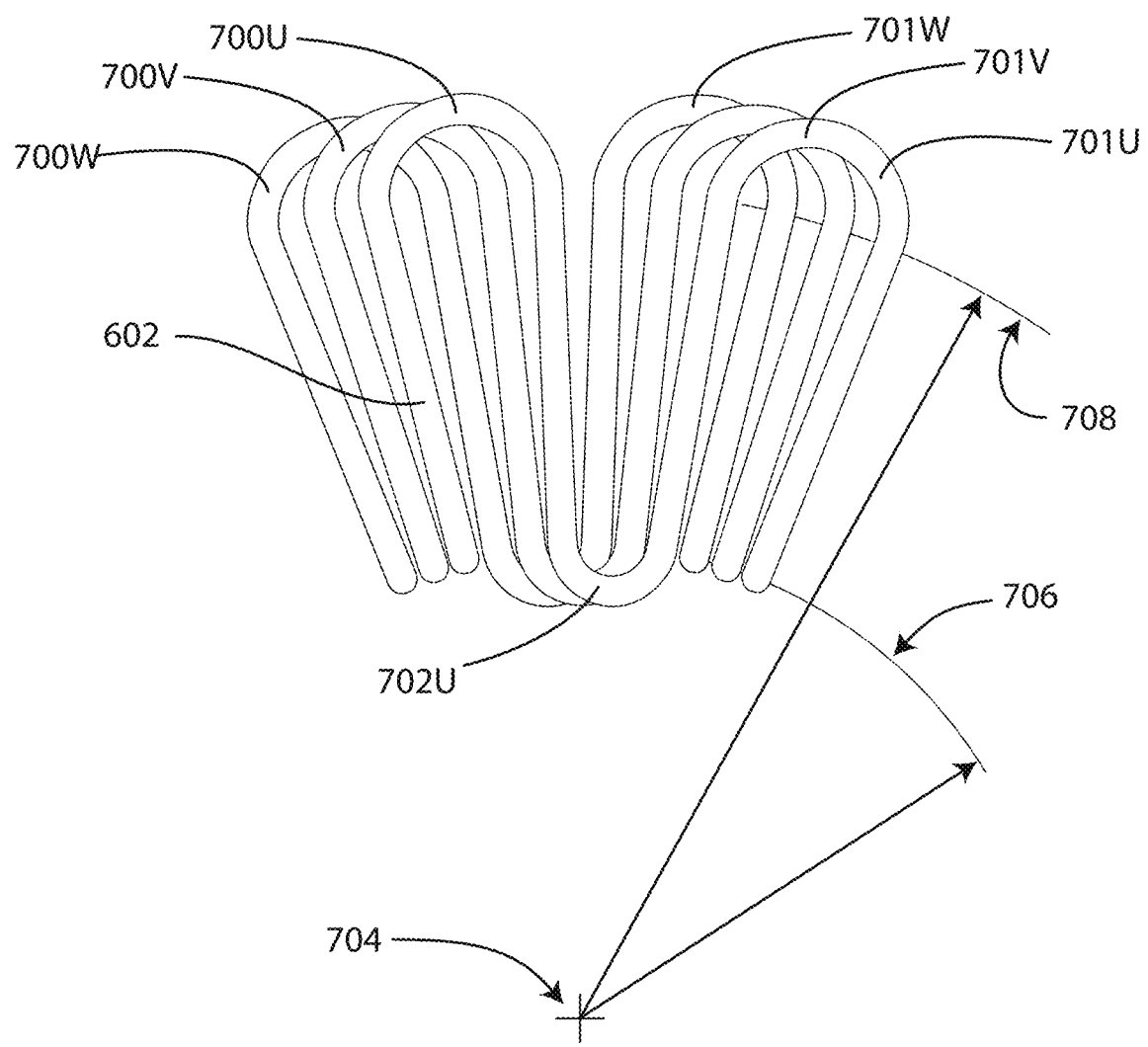
FIG. 7A is a detail representation of the winding phase conductors for a 3-phase motor/alternator with only an arc segment of the winding shown.

FIG. 7A shows further detail of the winding phase conductors. Only an arc segment of the winding about winding center 704 is shown, and the serpentine winding pattern continues along circles having arc segments 706 and 708 to form a full annular ring with phase terminals. The winding center 704 and conductor segment 602 are shown in axial view rather than the radial view in FIG. 6A. For phase winding U, outer end-turns 700U and 701U are shown, and inner end-turn 702U is shown. Outer end-turns 700B and 701B for phase V are shown, outer end-turns 700W and 701W for phase W are shown, and inner end-turns for phases V and W are shown but not numbered. The phase conductors are preferably litz wire to minimize eddy-current losses in the windings.

Figure 7B:
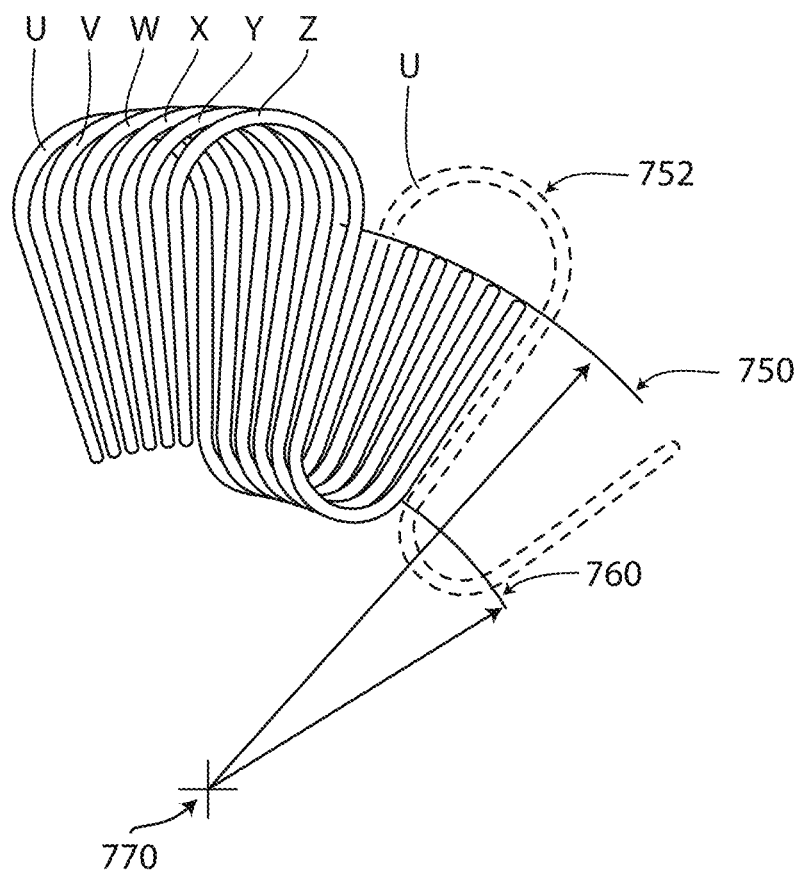
FIG. 7B depicts the winding phase conductors for a 6-phase motor/alternator with only an arc segment of the winding shown.

FIG. 7B depicts the winding phase conductors for a 6-phase motor/alternator. Only an arc segment of the winding is shown, and the serpentine winding pattern continues along circles having arc segments 750 and 760, and center 770. Segments of six phases U, V, W, X, Y, and Z are shown with a larger segment of phase U depicted in part in the dashed curve 752. Each phase has terminations for connection to the regenerative drive. There are a wide range of winding patterns possible as can be designed by those skilled in the art of motor design and differ relative to FIGS. 7A and 7B. The key feature needed for high reliability is that each point on a phase winding is not close to any other point on the same phase winding as is accomplished with the serpentine pattern.

The serpentine winding pattern ensures that no phase winding overlaps itself and the risk of a phase self-short, also known as a turn-to-turn short, is nil. Such a short is possible with other prior art winding designs and can be catastrophic to air vehicles. In the serpentine winding, phase-to-phase shorts are possible but can be protected against in a wye-connection with fuses on each phase at the wye connection. The serpentine winding is a significant advantage of this invention relating to safety and reliability. Serpentine windings with nearly arbitrary numbers of phases can be constructed and used in this type of motor within the teachings of the disclosed implementation.

Similarly, in alternative embodiments where high reliability of the winding is not required, multiple layers of the windings 7A can be stacked upon each other for example. Also, multiple layers of windings 7B can be stacked upon each other. Various winding geometries can be used as is known in the art of motor design.

Figure 8:
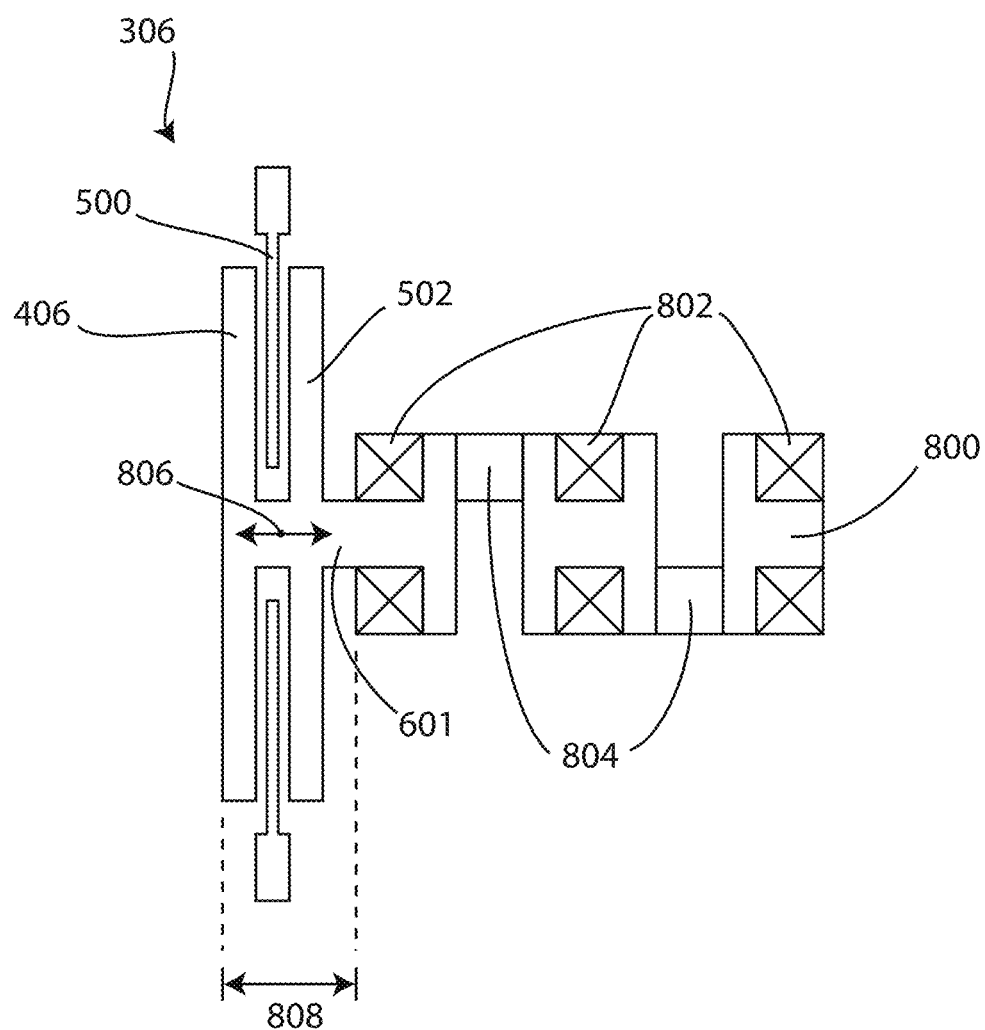
FIG. 8 is a section representation of the motor/alternator and a crankshaft of a piston engine as the ICE.

FIG. 8 is a section illustration of the motor/alternator 306 with a piston engine as the ICE 300 and a crankshaft 800 terminating in the engine shaft 601 engaged to the motor/alternator. Main bearings 802 engaged to the crankshaft 800 and crank pins 804 are shown on the crankshaft 800. The axial-gap polyphase motor/alternator 306 provides mechanical robustness, simplicity, and reduces weight as it minimizes the cantilever distance 808 from the ICE 300. The front motor rotor 406 and rear motor rotor 502 are rotationally supported by the bearings 802 of the ICE 300. Thus, additional bearings in the motor/alternator 306 are not required and the system is more robust to vibration and hence more reliable without requiring additional mass. The hybrid power system of the disclosed implementation is also more compact, and the support structure is lighter. Further, since Halbach arrays can project magnetic fields across relatively large gaps, the motor/alternator gaps can be designed to be more robust to mechanical motion 806 that develops due to wear in the bearings and tolerance stack-up, further increasing safety and reliability. In an aircraft, heavy flywheels are not an option, so anything attached to the engine output must be able to withstand the power stroke torque variation. The peak torque from a piston engine ICE can be 15 times the average torque output of the engine. This means the motor/alternator structure torsional strength must be over-designed by 15 times from the nominal average power output torque requirement. As seen in FIG. 8, the axial flux machine employed as the motor/alternator 306 disclosed herein includes the motor rotors 406, 502 extending radially from the axis 600 of the engine shaft 601 in an essentially flat disc which is extremely strong in torsion and hence there is essentially no weight penalty to have enough strength to handle the engine power stroke pulses. Moreover, the disc-like geometry of the motor rotors 406, 502 provide relatively large rotational inertia that acts as a flywheel closely coupled to the crankshaft 800 of the ICE. That is, the motor/alternator 306 serves to reduce rotational vibration as does a conventional piston engine flywheel.

Figure 9:
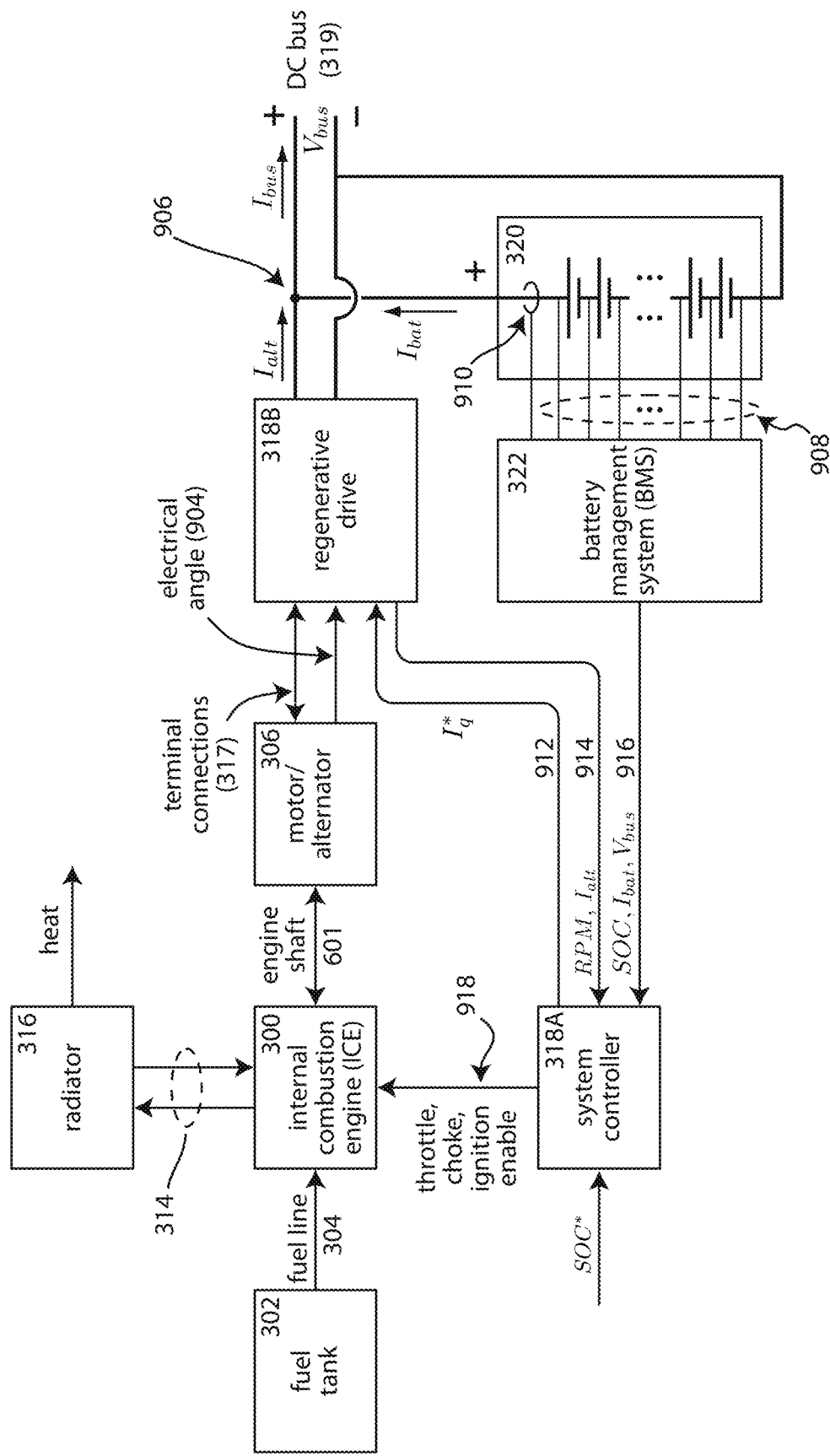
FIG. 9 is a functional block diagram of the example implementation showing key connections and interactions.

FIG. 9 shows a functional block diagram of the system and key connections and interactions. Most of the same components appear in mechanical form in FIG. 3. Note, however, that the system controller 318A and the regenerative drive 318B are shown separately in this figure and both are contained in the electronics unit 318 shown in FIG. 3. Also note that for redundancy the hybrid power system can be configured to have multiple battery packs and BMS systems or multiple "genset units" consisting of the ICE, system controller, and regenerative drive and ancillary equipment. The system controllers can be programmed to communicate and cooperate to meet system power requirements. All the redundant units are connected in parallel on the DC Bus.

In FIG. 9, fuel tank 302 provides fuel to ICE 300 via fuel line 304. The ICE may be 2-stroke, 4-stroke, or any kind of piston engine and have any number of cylinders, or it may be a gas turbine. Mechanical energy is transmitted to the motor/alternator 306 via engine shaft 601 when the ICE is running, and the alternator is supplying power. Mechanical energy is transmitted from the motor/alternator 306 when the ICE 300 is being started. The dual-Halbach-array motor/alternator 306 can have three, five, six or any number of phases with wye, delta, or other interconnection configurations. The motor/alternator power terminals are connected via terminal connections 317 to a regenerative drive 318B in electronics unit 318. Further, the motor/alternator 306 transmits a motor/alternator electrical angle 904 measured by Hall-effect sensors or shaft angle sensor to the regenerative drive 318B for purposes that include commutation and the calculation of engine RPM. The regenerative drive 318B serves as a synchronous rectifier or a Pulse Width Modulation (PWM) rectifier during power generation or as motor drive during ICE start. In the implementations disclosed herein Space Vector Pulse Width Modulation is employed. However, in alternative implementations other PWM methods may be employed with either analog or digital control implementation. The regenerative drive 318B outputs a positive DC current $I_{alt}$ during power generation and $I_{alt}$ is negative during ICE start. $I_{alt}$ is summed with the battery current $I_{bat}$ at node 906 to form the bus current $I_{bus}=I_{alt}+I_{bat}$. The regenerative drive also provides power at the bus voltage $V_{bus}$ on the DC bus 319. The DC bus voltage is matched to the voltage on the battery 320 and varies with the battery state-of-charge (SOC). A battery management system (BMS) 322 monitors the battery 320 and balances the cell voltages to be nearly identical via balance sense connections 908. The BMS 322 also measures the battery current using current sensor 910.

The BMS 322 transmits the calculated SOC, the measured value of $I_{bat}$, and the measured value of $V_{bus}$ to a system controller 318A in the electronics unit 318 via connection 916. The regenerative drive 318B also measures the bus voltage for its internal use. The BMS 322 incorporates cell voltage sensing circuits, battery pack current sensor, and a microprocessor running an algorithm to estimate the state of charge from the cell and pack measurements. The BMS 322 may also include cell temperature sensors and may include a pack disconnect relay/switch that can be controlled to break the current path connection from the output of the battery pack to the DC bus. The system controller 318A also receives the motor/alternator angular velocity in revolutions per minute (RPM), the value of $I_{alt}$ via connection 914 from the regenerative drive, and the desired battery state-of-charge SOC*. The system controller 318A, in turn, transmits a throttle command on connection 918 and a regenerative drive current command $I^*_q$ 912. During start-up and shutdown the system controller 318A also transmits choke and ignition enable commands.

In fault tolerant embodiments of the hybrid power system of the disclosed implementation the battery pack and/or the regenerative drive may have a disconnect switch, circuit breaker, or disconnect relay controlled by the system controller. These disconnect switches can be used to isolate faulted electronics or a faulted battery pack that could short out the DC bus. If the battery pack is disconnected from the DC Bus due to a fault, then the control algorithm for the combined engine, motor/alternator, and regenerative drive changes from the power and current control scheme previously described to an algorithm that regulates the bus voltage to a constant commanded value, based on the same general control scheme utilizing feed-forward maps and feed-back loops on the prime mover speed and the DC bus voltage.

Figure 10:
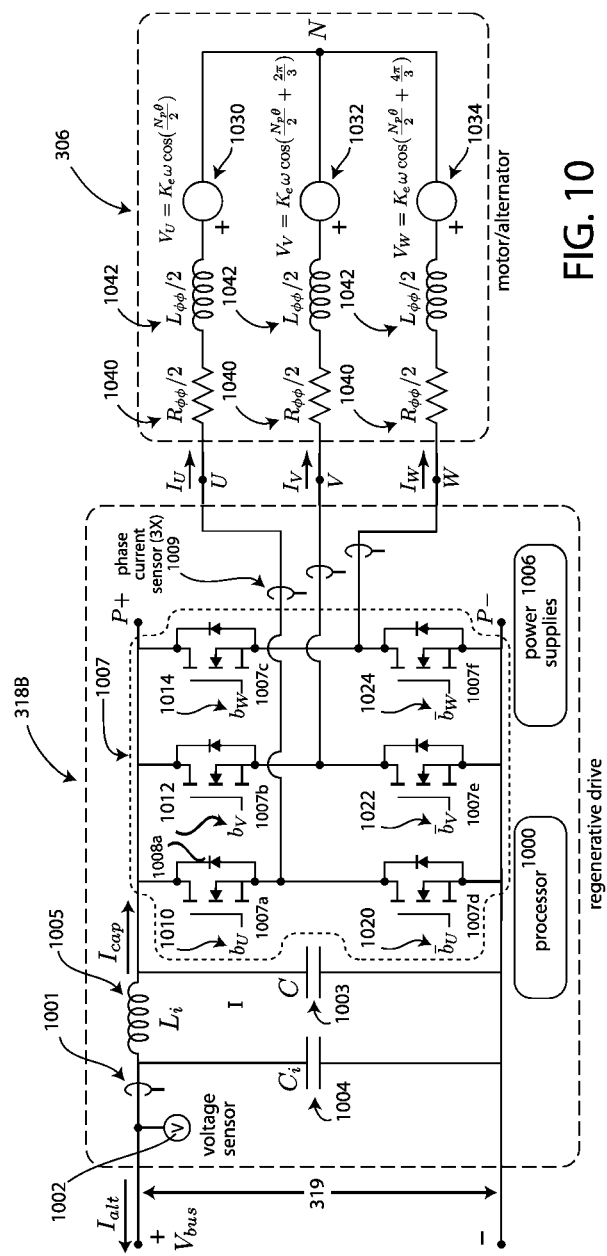
FIG. 10 is a schematic diagram of the regenerative drive for a three-phase motor/alternator.

FIG. 10 is a schematic diagram of the regenerative drive 318B for a three-phase motor/alternator. The regenerative drive 318B is connected to the DC bus 319 at terminals + and − and supplies a current $I_{alt}$ to the DC bus when the alternator is producing power. $I_{alt}<0$ when the ICE 300 is starting (aka "Motor Mode"). A current sensor 1001 monitors $I_{alt}$ for transmission to the system controller 318A. Capacitor 1003 with value C is the primary bus capacitor that maintains the bus voltage on a semiconductor switch power bridge, implemented in the examples herein as a MOSFET power bridge 1007, during pulse-width modulation (PWM) and attenuates current ripple transmitted to the DC bus 319. Other semiconductor switches, as known in the art, are employed in alternative implementations. Capacitor 1004 with value $C_i$, and inductor 1005 with value $L_i$, provide additional attenuation of current and voltage ripple being transmitted to the DC bus. The combination of capacitor $C_i$, and inductor $L_i$, is referred to herein as the electromagnetic interference (EMI) filter. Because of the filtering effects of primary bus capacitor and the EMI filter, the current ripple in $I_{alt}$ is much less than $I_{cap}$. The positive sense for $I_{cap}$ is chosen to be consistent with current flow during motor mode and is into the MOSFET power bridge 1007.

During motor mode, the peak phase-to-phase motor/alternator voltage is less than bus voltage and the regenerative drive "bucks" the voltage down to the needed phase voltages and draws power from the bus. During alternator mode and SVPWM submode the regenerative drive boosts the phase voltages up to the bus voltage and outputs power. When the peak phase-to-phase voltages reach or slightly exceed the bus voltage, the boosting provided by the SVPWM is not needed and the drive is operated in a synchronous rectifier submode. In the synchronous rectifier submode, the MOSFET power bridge 1007 is controlled to mimic a passive diode bridge rectifier—the MOSFETs are switched on as if they were diodes. Thus, the MOSFETs are switched at a much slower rate relative to SVPWM and switching losses are reduced and efficiency is increased. A feature of this implementation is that the generator constant of the motor/alternator (aka back-emf constant) is chosen such that rotational speed of the engine shaft 601 of the ICE 300 at which the peak phase-to-phase voltages equal the bus voltage is 100% to 115% of the rotational speed for peak engine power 370 (about 5600 RPM in the case of the engine curves of FIG. 3B). In this way, the peak power point of the ICE is a peak efficiency point of the rectification process. The switching of the MOSFETs in synchronous rectifier submode is accomplished using the electrical angle 904 as the time at which the phase-to-phase voltage exceeds the bus voltage is a function of the electrical angle.

FIG. 10 also shows the MOSFET power bridge 1007 incorporates six MOSFETs 1007a-1007f connected across the bus in complimentary pairs and controlled, respectively, by binary gate voltage signals $b_U$ 1010, $b_V$ 1012, and $b_W$ 1014, and their logical complements 1020, 1022, and 1024 indicated with an overbar. The actual voltage levels corresponding to "on" and "off" depend on the MOSFET selected. In any half bridge (two transistors (one complimentary pair) connected to a common phase terminal of the motor/alternator 306) either the primary or complimentary transistor (e.g. 1007a or 1007d) is on at one time. There is an exception that, during switching, one transistor is turned off before the other is turned on by about one, a few, or a few tens of nanoseconds to prevent a short circuit through the half-bridge. The regenerative drive incorporates a processor 1000 in the form of a microcontroller, digital signal processor, field-programmable gate array (FPGA), microprocessor or other computing element with associated memory to receive the current input command $I^*_q$ 912, the bus voltage from voltage sensor 1002, the phase currents from phase current sensors 1009, the electrical angle 904, and other system inputs and responsively control gate voltage signals 1010, 1012, 1014, 1020, 1022, and 1024 to the MOSFETs in the power bridge 1007, provide phase current feedback control with the three phase current sensors 1009, provide overcurrent and overvoltage protection, and communication functions. Voltage is sensed with voltage sensor 1002 and received by the processor 1000 to control the duty cycle of the PWM modulation. The regenerative drive 318B also incorporates power supplies 1006 to supply power to the processor 1000 and gate drivers (not shown) for the power bridge 1007.

FIG. 10 also shows the regenerative drive connection to the exemplary three-phase motor/alternator 306 at phase terminals U, V, and W. The positive senses of the phase currents $I_U$, $I_V$, and $I_W$ are indicated with arrows and the currents are alternating in both alternator and motor modes. Phase-to-neutral back-emf voltage source modules 1030, 1032, and 1034 are in phase with the phase currents during motor mode and out of phase during alternator mode. The formulas implemented by the phase-to-neutral back-emf voltage modules are shown in the figure and are a function of the back-emf constant $K_e$, the engine shaft angular velocity co, the engine shaft angle θ, and the number of motor poles $N_p$. A neutral point N of the wye connection is shown. The phase-to-phase, aka terminal-to-terminal, resistances and inductances are $R_{\phi\phi}$ and $L_{\phi\phi}$ respectively. Thus, the phase-to-neutral resistances 1040 and inductances 1042 are one-half these values and equal to $R_{\phi\phi}/2$ and $L_{\phi\phi}/2$ respectively. The number of phases is shown to be three for purposes of illustration and additional half-bridges may be added for additional phases at terminals P+ and P−, as will be described subsequently. Further, a half-bridge connection to one or more neutral points in one or more wye connections is possible.

Figure 11:
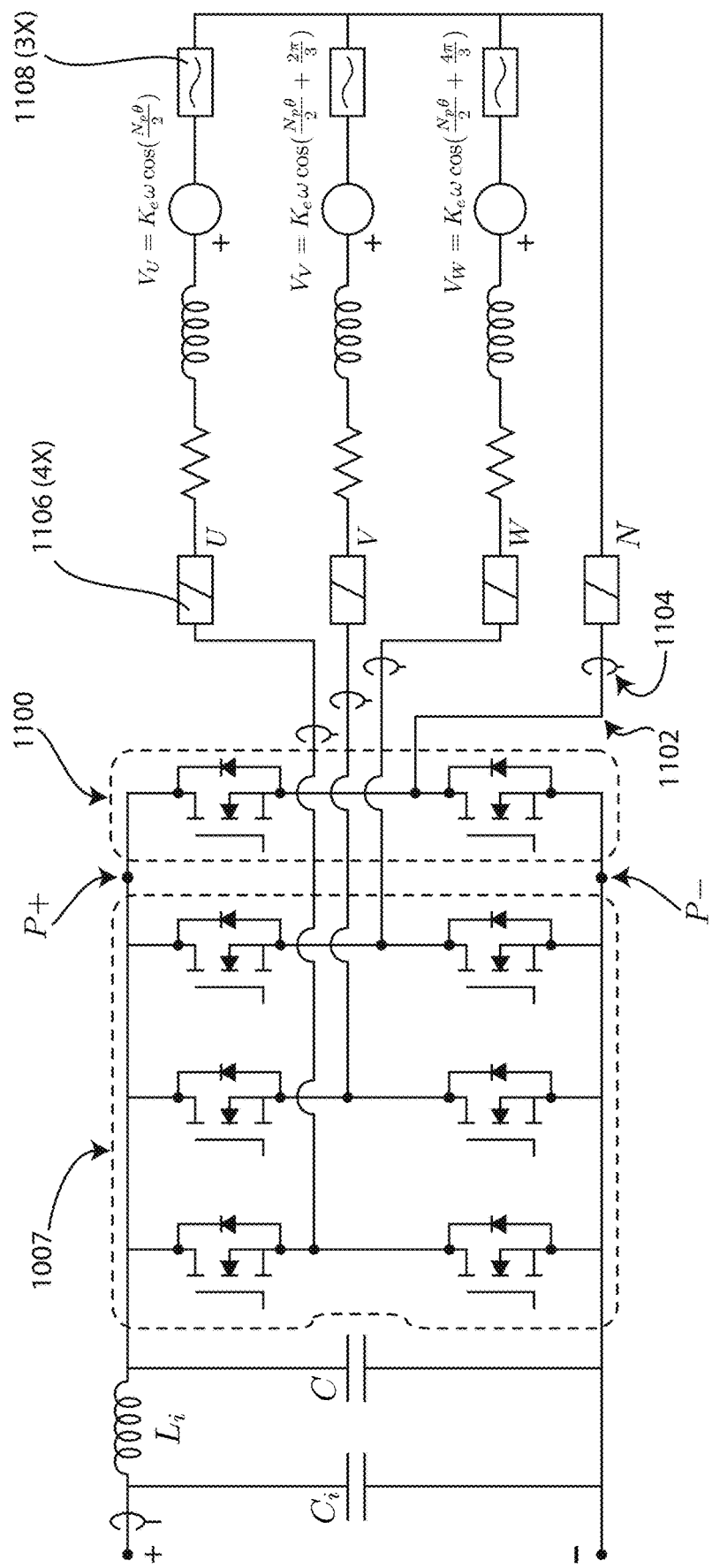
FIG. 11 is a schematic diagram of the addition of an additional half-bridge connected via a conductor to the neutral point of a wye-connected three-phase motor/alternator.

Relative to the circuit of FIG. 10, FIG. 11 depicts the addition of an additional half-bridge 1100 connected at the P+ and P− terminals and in parallel with the MOSFET power bridge 1007 and also connected via conductor 1102 to the neutral point N of a wye-connected three-phase motor/alternator. FIG. 11 illustrates a 4-leg wye connection to enable a fault tolerant scheme as described in F. Richardeau, J. Mavier, H. Piquet and G. Gateau, "Fault-Tolerant inverter for on-board aircraft EHA," 2007 European Conference on Power Electronics and Applications, Aalborg, 2007, pp. 1-9, doi: 10.1109/EPE.2007.4417537, which is incorporated herein in its entirety by reference. In the event of one or more failed half-bridges or windings, the corresponding leg(s) can be disconnected with one of the corresponding solid-state circuit breakers or relays 1106. Then the neutral line N with current sensor 1104 provides a current return path. It is understood that the neutral line is generally not at any constant voltage and the name is used for historical reasons. Also shown in FIG. 11 are fuses 1108 that protect against phase-to-phase shorts in the preferred serpentine winding in the polyphase dual-Halbach array axial-gap motor/alternator 306. It is understood that an embodiment may have circuit breakers 1106, or fuses 1108, or both.

Figure 12:
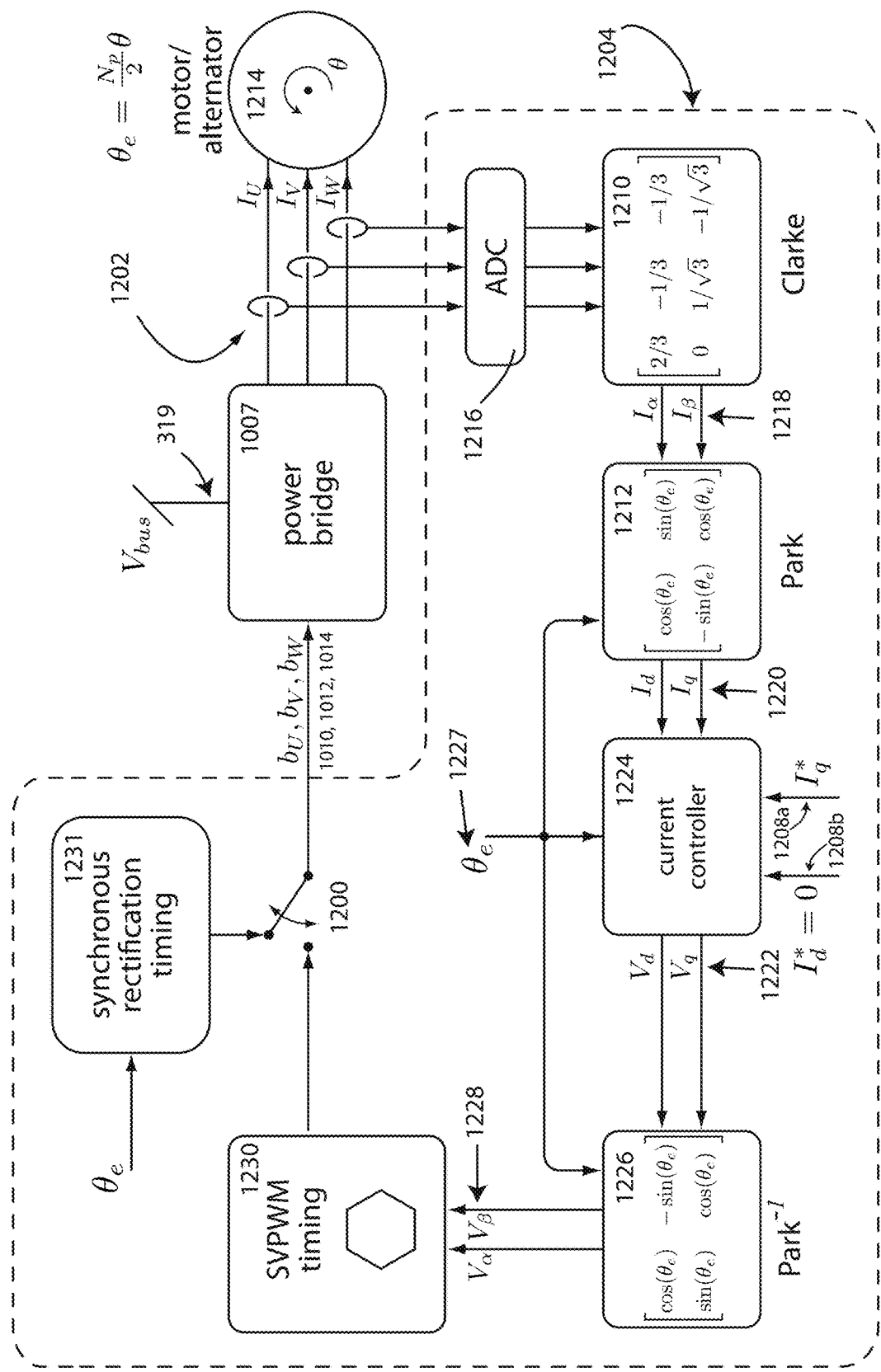
FIG. 12 is a block diagram illustrating the control of the MOSFET power bridge for a three-phase regenerative drive.

FIG. 12 illustrates a controller 1204 (which may be included in the processor 1000) for the MOSFET power bridge 1007 of FIG. 10 for a three-phase regenerative drive. The feedback loop shown serves the purpose of maintaining the phase currents of motor/alternator 306 at the set-point $(0, I^*_q)^T$ in the well-known dq coordinates and the set-point is input as two signals $I^*_q$ 1208a and $I^*_d$ 1208b. (The superscript T indicates transpose so that $(0, I^*_q)^T$ is a column vector. Column vectors are used since a matrix is multiplied on the right by column vector to produce another column vector. Since the Clarke transformation module 1210 and Park transformation module 1212 are amplitude preserving, this set-point corresponds to phase currents with peak values equal to $I^*_q$. The Park transformation module 1212, current controller 1224, and inverse Park transformation module 1226 use the electrical angle 904 of the motor/alternator 306. The d-current has a set-point $I^*_d=0$ since it does not produce torque for energy transfer but does produce wasted heat via Joule heating in the windings and other loss mechanisms. Recall that $I^*_q$ 912 is the command signal shown in FIG. 9 transmitted from the system controller 318A to the regenerative drive 318B.

Referring again to FIG. 12, the power bridge 1007 controls the phase voltages for motor/alternator 306 and hence the phase currents $I_U$, $I_V$, and $I_W$ that are measured by current sensors 1202. The motor/alternator shaft angle is θ so that the electrical angle is $$\theta_e = \frac{N_p \theta}{2}$$

and the electrical frequency is $$\omega_e = \frac{d}{dt}\theta_e.$$

Current measurements are converted to binary numbers by the analog-to-digital converter 1216 and subsequently processed digitally by the processor 1000 and the modules in the controller 1204. It is understood that the various modules in FIG. 12 can be implemented in either software or hardware. For example, field-programmable gate arrays may be used. The column vector $(I_U I_V I_W)^T$ of currents output by the ADC 1216 are in units of amps. Operation by the matrix Clarke transformation module 1210 produces the current column vector $(I_\alpha I_\beta)^T$ in αβ coordinates and represented as two signals on connectors 1218. The Clarke transformation is amplitude preserving in the sense that the peak value of each of the components of $(I_\alpha I_\beta)^T$ is the same as the peak value of the components $(I_U I_V I_W)^T$ provided that the motor/alternator phase currents are sinusoidal and separated in phase by 120 electrical degrees as is common in three-phase motors. $(I_\alpha I_\beta)^T$ is generally rotating at the electrical frequency of the motor and is slowly varying, when well controlled, in the rotating dq coordinate frame. (Use of the terms "generally rotating" and "slowly varying" are used for purposes of communication and are not intended to be restrictive). Multiplying $(I_\alpha I_\beta)^T$ by the matrix$^T$ rotation Park transformation module 1212 produces a motor/alternator current $(I_d I_q)^T$ in dq coordinates at connectors 1220 and is compared to the setpoint $(0, I^*_q)^T$ by the current controller 1224 that commands a motor voltage $(V_d V_q)^T$ in dq coordinates at connectors 1222. The voltage $(V_d V_q)^T$ is transformed into αβ coordinates by the inverse Park transformation module (Park$^{-1}$) 1226 and the resulting modified voltage output vector $(V_\alpha V_\beta)^T$ at connectors 1228 controls the pulse-width$^T$ modulation of the power bridge via the SVPWM timing module 1230. The preferred modulation scheme is Space-Vector Pulse-Width Modulation (SVPWM) which is well-known and is summarized below. Alternatively, in alternator mode, the power bridge is switched with switch 1200 to synchronous rectification timing to affect synchronous rectification submode as described below.

The SVPWM timing module 1230 produces the binary switch state row vector $(b_U b_V b_W)$ 1010, 1012, 1014 which defines the state of the three half-bridges in the power bridge 1007. The SVPWM switching frequency is typically in the range of 20 kHz to 100 kHz and high-performance SiC and GaN MOSFETs allow for switching frequencies that are higher. The electrical frequency $\omega_e$ of the motor/alternator 306 is typically a few kHz maximum and the ratio of SVPWM frequency to electrical frequency is typically ten to twenty or more. These values and ratios are intended to by illustrative and not restrictive. Depending on the value of $I^*_q$, the motor/alternator is in motor mode or alternator mode. Our sign convention is such that $I^*_q>0$ corresponds to motor mode and $I^*_q<0$ corresponds to alternator mode. In motor mode, the peak phase-to-phase voltages are less than the bus voltage and the MOSFET power bridge 1007 bucks the bus voltage down to the phase-to-phase voltage waveforms. In alternator mode, there are two voltage conditions. First, when the alternator peak phase-to-phase voltages are less than about 95% to 97% of the bus voltage, the power bridge 1007 boosts the alternator phase-to-phase voltages up to the bus voltage by operating in SVPWM submode. When the alternator phase-to-phase voltages reach and slightly exceed the bus voltage, the power bridge is controlled in the Synchronous Rectification Submode.

The Synchronous Rectification Submode, is another power generation mode and a submode of alternator mode. This is accomplished by switching the switch 1200 to transmit the output of the synchronous rectification timing block 1231 to the power bridge 1007 so that it responds as a bridge rectifier. For purposes of illustration, assume all MOSFETs in the power bridge 1007 are in the off state. Then the body diodes in the MOSFETs (for example body diode 1008a in MOSFET 1007a) collectively form a bridge rectifier and deliver power to the bus when the peak phase-to-phase voltages exceed the bus voltage by a diode drop or more. In operation in the synchronous rectification submode, at those points in time when a MOSFET body diode would be conducting, the synchronous rectification timing block 1231 turns on that MOSFET so that the voltage drop is reduced relative to the body diode drop and the phase current experiences only the reverse on-resistance of the MOSFET. The synchronous rectification timing block 1231 is configured to turn on each respective MOSFET slightly after the body diode conducts to avoid forward conduction through the MOSFET. This mode is used to deliver peak power to the bus and reduces switching losses relative to SVPWM submode of the alternator mode. This mode of operation contributes the overall efficiency of the system. In some embodiments for purely hovering vehicles that operate continuously at maximum power it is cost-and-weight beneficial to use only a passive diode bridge rectifier, or a synchronous rectifier without PWM capability, that always operates in synchronous rectifier submode. In this case the prime mover is augmented with a separate electric, hand pull, or externally applied starter motor since the power electronics lack the ability to control the motor/alternator as a motor.

In transitioning eVTOLs high power is required at take-off and hover, and high efficiency is desired in long-duration cruise operation. These requirements fit well with the hybrid power system of the disclosed implementation. Note in FIG. 3B that peak power 370 occurs near maximum engine RPM, but the best fuel consumption point 360 is at around 50% peak power and 50% of the speed at peak power. This is typical of piston engine performance, especially of 4-stroke engines, and matches well with the capabilities of the two-mode rectification system used in a transitioning eVTOL. The ICE 300 operates at peak power and synchronous rectifier submode during short periods of vertical take-off and hover, and, during cruise, the ICE is either operated at the peak efficiency and SVPWM submode for battery charging or is turned off.

Figure 13:
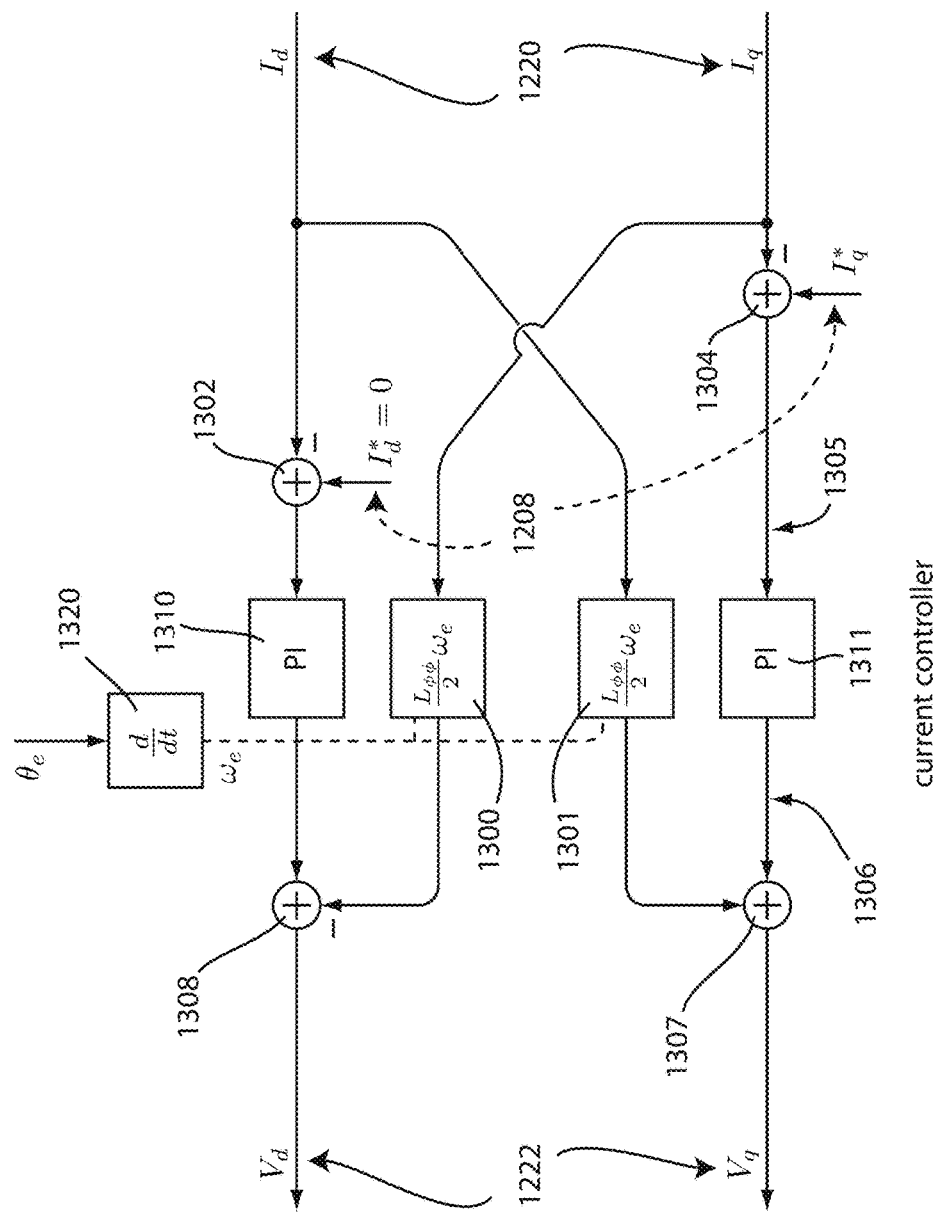
FIG. 13 is a detail schematic of the current controller in FIG. 12.

FIG. 13 provides detail to the current controller 1224 in FIG. 12. Observe that the inputs at connectors 1220 and 1208 and outputs at connectors 1222 in FIG. 13 match those of the current controller in FIG. 12 as expected. Input $I_q$ is differenced with the command input $I^*_q$ at summing junction 1304 and the error signal 1305 is the input to a proportional-plus-integral (PI) controller 1311 that is designed to provide suitable stability margins and sufficiently fast time response of the closed-loop current control system. The output of the PI controller 1311 is summed with the output of the cross-term block 1301 to form the voltage command $V_q$. Similarly, input $I_d$ is differenced with the command input $I^*_d=0$ at summing junction 1302 to form the input to the PI controller 1310 that preferably has the same control gains and PI controller 1311 as the d and q dynamics exhibit considerable symmetry. The output of PI controller 1310 is differenced with the output of the cross-term block 1300 in summing junction 1308 to produce the voltage command $V_d$. Note that the cross-term block 1300 and 1301 have gains that vary with the electrical frequency $\omega_e$ derived from the electrical angle $\theta_e$ via differentiation in block 1320. The inclusion of the cross-term blocks provides for robust stability of the control system at higher motor/alternator speeds. We refer to this feature of a control system having these speed-dependent cross terms as motor/alternator dq decoupling. Importantly, the value output from blocks 1300 and 1301 need not be exact and can vary plus or minus 50% or more and still improve performance relative to systems that do not have these cross terms.

The cross-term blocks 1300 and 1301 can be understood in terms of the electrical dynamics of the motor/alternator in dq coordinates:

$$\begin{bmatrix} V_d \\ V_q \end{bmatrix} = \begin{bmatrix} \frac{R_{\phi\phi}}{2} + \frac{L_{\phi\phi}}{2}s & -\frac{L_{\phi\phi}}{2}\omega_e \\ \frac{L_{\phi\phi}}{2}\omega_e & \frac{R_{\phi\phi}}{2} + \frac{L_{\phi\phi}}{2}s \end{bmatrix} \begin{bmatrix} I_d \\ I_q \end{bmatrix} + \begin{bmatrix} 0 \\ K_e\omega \end{bmatrix}$$

where s is the Laplace or differentiation operator, $\omega$ is the shaft angular velocity of the motor/alternator and $K_e$ is the back-emf constant. Note the off-diagonal terms in the matrix above. The exact motor/alternator dq decoupling cancels these off-diagonal terms, diagonalizes the matrix, and decouples the system into two single-input single-output systems that are time-invariant rather than time-varying with the non-constant electrical frequency $\omega_e$.

Figure 14:
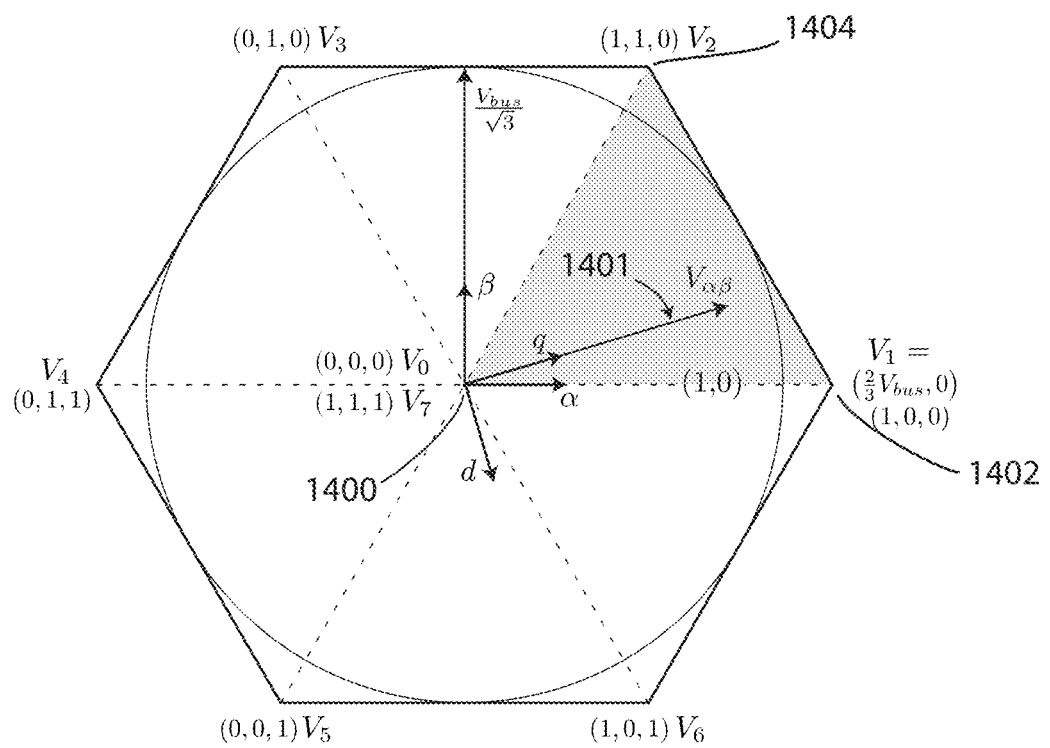
FIG. 14 is a representation of the SVPWM timing block.

FIG. 14 provides detail for the SVPWM timing block in FIG. 12. The SVPWM timing block in FIG. 12 accepts as input the vector $V_{\alpha\beta}=(V_\alpha, V_\beta)^T$ 1401 in FIG. 14, and outputs the rapidly time-varying switch state ($b_U$, $b_V$, $b_W$) to the power bridge 1007. Note that the vertices of the hexagon in FIG. 14 are labeled with various switch states and the hexagon represents a subset of possible values for $V_{\alpha\beta}$. Also, the origin 1400 in FIG. 14 is labeled with both the switch states (0,0,0) and (1,1,1) since there are no voltage differences across the motor/alternator terminals when the half-bridges are all high or all low. These are both called "zero states." In the (1,0,0) switch state at 1402, the voltage on the motor/alternator terminals in αβ coordinates is (⅔$V_{bus}$, 0) as shown and the voltages at the other vertices can be inferred from the geometry. For example, the voltage for the (1,1,0) switch state is $$V_2 = \left(\frac{1}{\sqrt{3}}V_{bus}, \frac{1}{3}V_{bus}\right)$$

at 1404. The vertices of the hexagon and the origin are the only possible output voltages that can be applied to the motor/alternator. However, by switching rapidly between the vertices and the origin, any voltage within the hexagon can be applied on average. Consider, for example, the vector $V_{\alpha\beta}$ (1401) shown in the shaded triangle with vertices labeled (0,0,0), (1,0,0), (1,1,0) and (1,1,1), at locations 1400, 1402 and 1404. By switching rapidly between the triangle vertex states and using the integration effects of the motor/alternator phase inductances, the desired $V_{\alpha\beta}$ can be produced on average. In standard SVPWM, the sequence followed in a period $T_s$ for the vector $V_{\alpha\beta}$ shown is (0,0,0)→(1,0,0)→(1,1,0)→(1,1,1)→(1,1,0)→(1,0,0)→(0,0,0). The vertices of the triangle are traversed in a counterclockwise direction and then backwards in a clockwise direction for this triangle. The dwell time at each vertex depends on $V_{\alpha\beta}$ and is known in the art of SVPWM design. The dwell times are given, for example, in Narayanan, G., et al. "Space vector based hybrid PWM techniques for reduced current ripple." IEEE Transactions on Industrial Electronics 55.4 (2008): 1614-1627, which also describes variations on standard SVPWM that reduce output current ripple—such alternative SVPWM schemes and other PWM schemes may be employed in alternative implementations of this invention. The sequences to produce values in other regions of the hexagon correspond to the vertices of the triangle containing the value of the vector $V_{\alpha\beta}$.

Figure 15A:
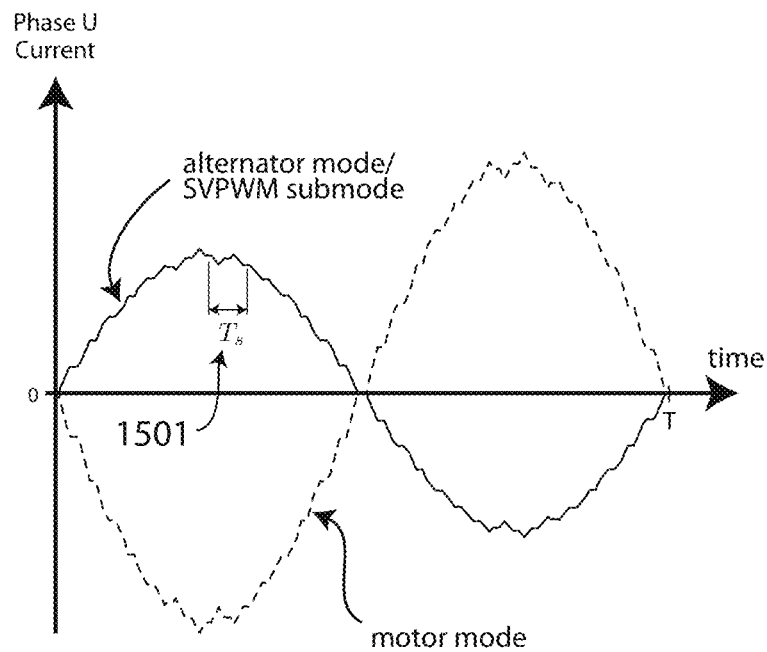
FIG. 15A is a graphical representation of current waveforms for Phase U of the motor/alternator in motor mode and alternator mode/SVPWM submode.
Figure 15B:
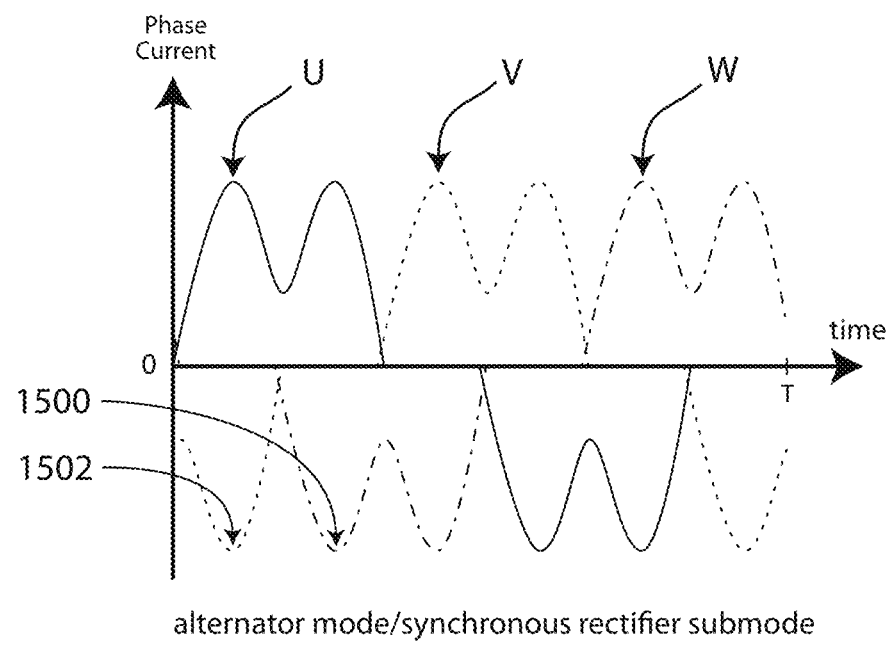
FIG. 15B is a graphical representation of current waveforms in individual phases in alternator mode/synchronous rectifier submode.

FIG. 15A shows exemplary current waveforms for Phase U of the motor/alternator in motor mode and alternator mode/SVPWM submode. The waveforms differ in sign corresponding to different directions of power flow. The SVPWM period $T_s$ is shown at 1501. The waveforms are approximately sinusoidal with period T corresponding the electrical period of the motor/alternator. FIG. 15B depicts current waveforms in individual phases in alternator mode/synchronous rectifier submode. As expected, the waveforms are not sinusoidal due to current pulses that occur when the phase-to-phase voltages exceed the bus voltage. The pulses are rounded due to non-zero battery impedance in a real system and other impedances affecting the phase currents. Note that there are two peaks in phase U for positive current corresponding to negative peak 1502 in phase V and negative peak 1500 in phase W. When these currents are rectified, the resulting bus current has six pulses since the positive going pulses align with the negative going pulses.

Figure 16A:
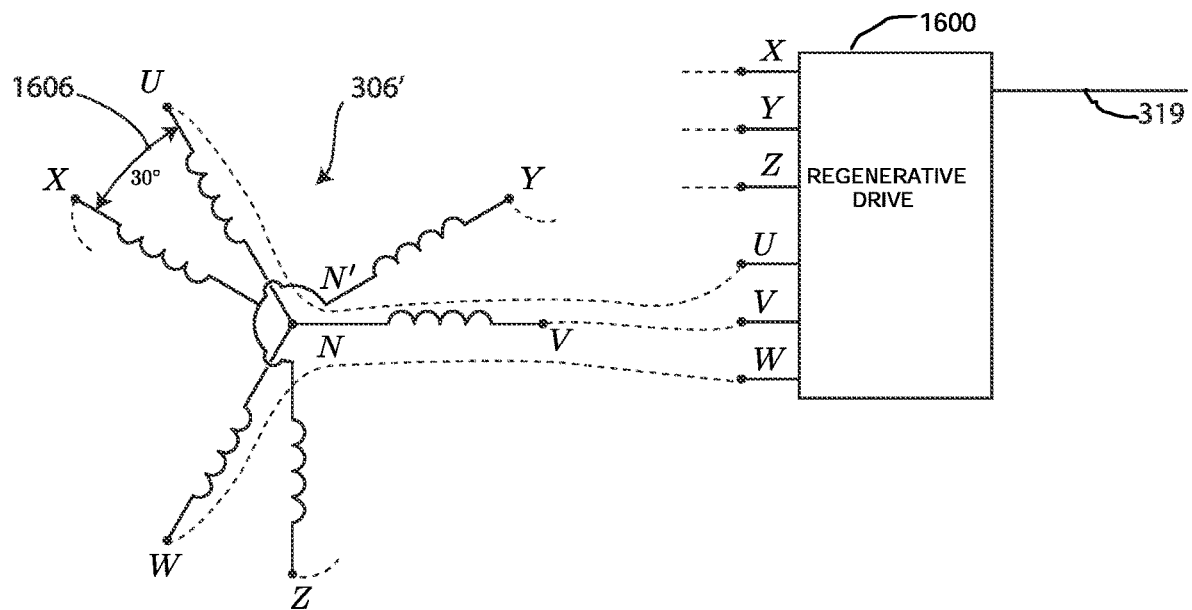
FIG. 16A is a representation of an exemplary six-phase motor/alternator comprised of two three-phase wye connections connected to a regenerative drive.

FIG. 16A shows an exemplary six-phase motor/alternator 306' having two three-phase wye connections connected to a regenerative drive 1600. Regenerative drive 1600 is comprised of two three-phase regenerative drives that share a common bus capacitor (circuits of FIG. 10 and FIG. 18 connected at P+ and P−), referred to herein as a 2×3 redundant system. The connections for phases U, V, and W are shown and those for phases X, Y, and Z are shown interrupted to avoid clutter in the figure. The points X on the motor/alternator and regenerative drive are connected as are Y and Z. The regenerative drive is connected to the power bus 319. Note that the electrical angle 1606 between phases U and X is 30 electrical degrees. A phase angle of 60 degrees is undesirable since this would put phase U and phase Z at 180 degrees out of phase and the torque production capability of those two phases would be identical. Smoother performance is achievable in motor mode and alternator mode for the phase relationships shown, and bus capacitor current ripple at the motor/alternator commutation frequency is reduced as well.

Figure 16B:
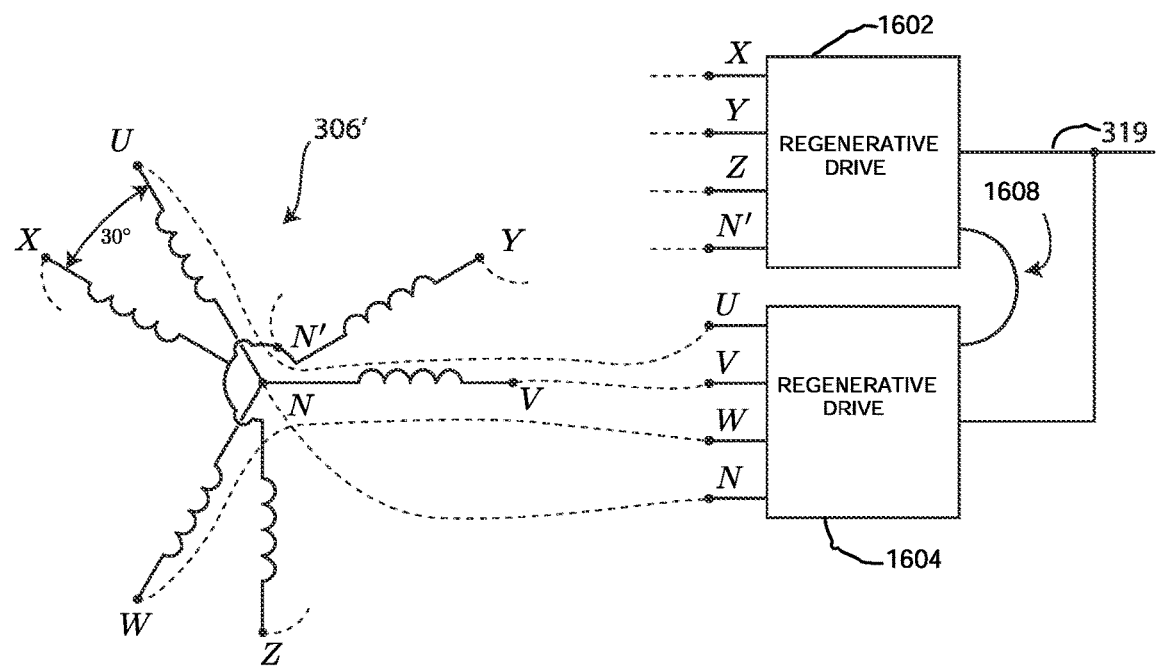
FIG. 16B is a representation of an alternative embodiment with two separate regenerative drives with additional redundancy achieved by connecting the neutral points to additional half-bridges in the regenerative drives as shown in FIG. 11.

FIG. 16B shows an additional alternative embodiment with two separate regenerative drives 1602, 1604 with additional redundancy achieved by connecting the neutral points to additional half-bridges in the regenerative drives as shown in FIG. 11. The regenerative drives are connected to the bus 319 and can synchronize via connection 1608. This configuration is defined herein as a 2×(3+N) system.

Figure 17:
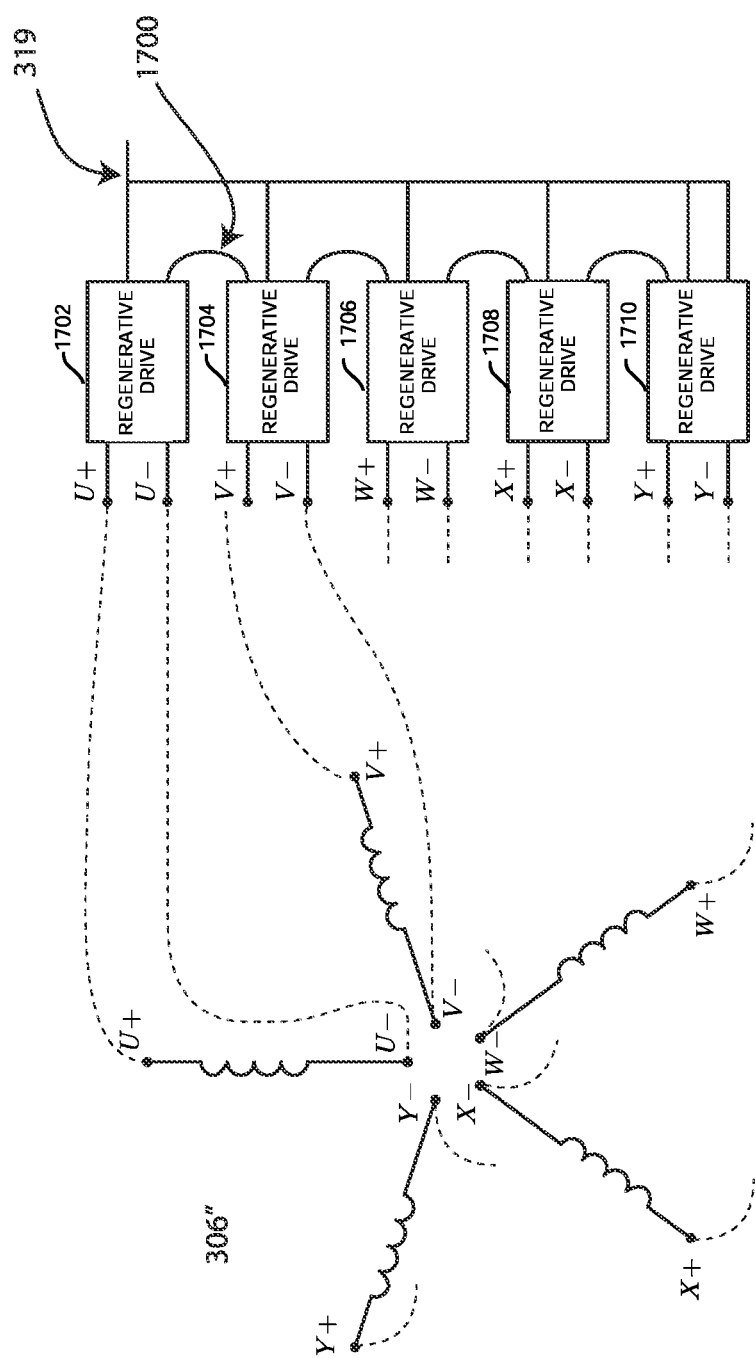
FIG. 17 is a representation of another redundant system where five phases are driven independently.

FIG. 17 shows yet another redundant system for a motor/alternator 306″ where five phases are driven independently. The five regenerative drives 1702, 1704, 1706, 1708 and 1710 connect to the power bus 319 and can synchronize via four connections 1700. This configuration is referred to herein as a 5I system.

An additional feature of the disclosed implementation is the controlling of currents in motor/alternators having one or more faulted phases that are disconnected from the regenerative drive. This feature is referred to herein as optimal fail-operational commutation (OFOC). The goal is to deliver constant power into the back-emf voltage sources that are available so that the motor/alternator delivers constant torque, which can be positive or negative. Denote by V(t) the column vector of back-emf voltages for the functioning windings. For example, suppose Phase W has failed and is disconnected in FIG. 11. Then, $V(t)=(V_U(t), V_V(t))^T$. The minimum root-mean-square (rms) current vector for these two phases that provides a constant power into the two remaining back-emf voltages can be computed with the well-known Moore-Penrose pseudoinverse according to $$I(t)=(V(t)^T V(t))^{-1} V(t) P \qquad \text{Eqn. 1}$$

where P is the desired power level to be delivered to the engine shaft via electromagnetic torques (P is the desired output power plus mechanical losses due to friction, windage, eddy-current drag, etc.). It is understood that the benefits of this OFOC can be largely achieved when the currents are not exactly those given in Eqn. 1. When SVPWM is used, there is current ripple and OFOC is approximated, but good performance is still achieved. Also, if sinusoidal back-emfs are assumed, but there is some error in this assumption, the approximation of Eqn. 1 still provides very good performance. Thus, definition of OFOC includes any current waveform Î(t) that is close to that value of I(t) in Eqn. 1 in the sense $$\frac{\sqrt{\frac{1}{T}\int_0^T (\hat{I}(t)-I(t))^2 dt}}{\sqrt{\frac{1}{T}\int_0^T (I(t))^2 dt}} < \delta. \qquad \text{Eqn. 2}$$

where T is the electrical period and δ is 0.01, 0.1, or 0.25 and represents a normalized root-mean-square error.

Figure 18:
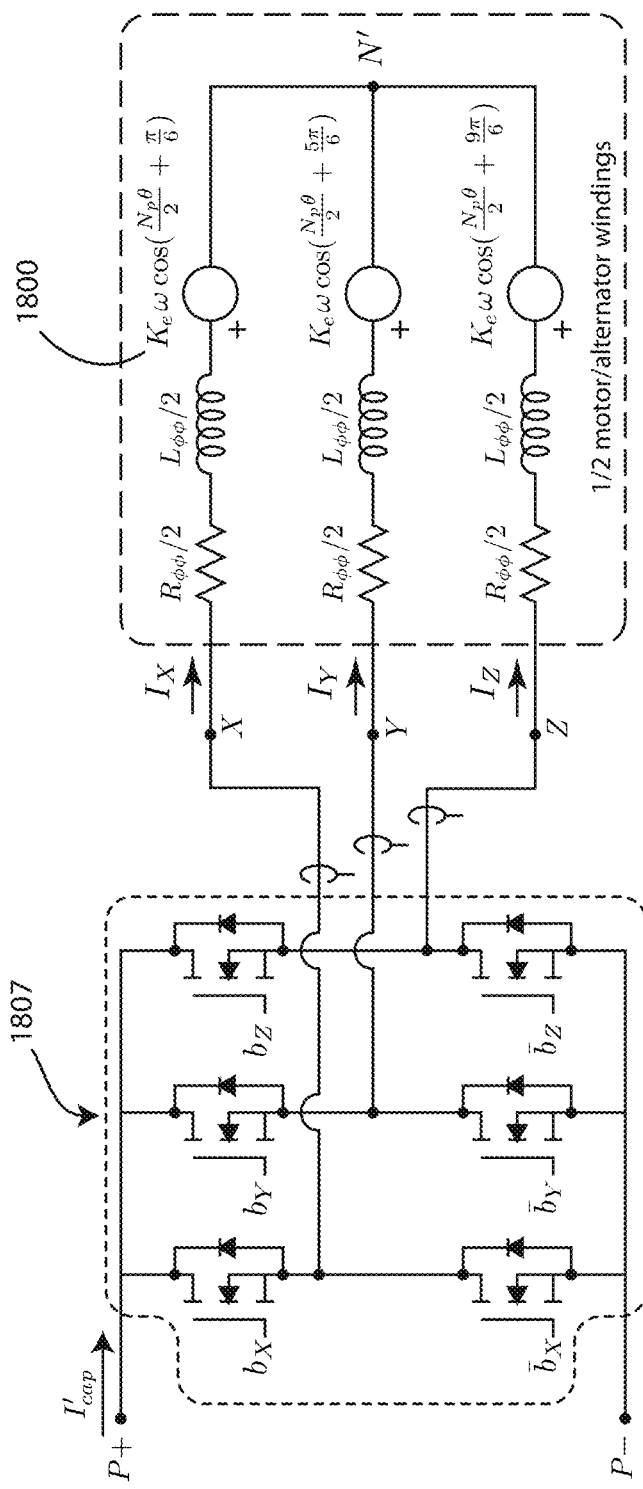
FIG. 18 is a schematic diagram of details of the second regenerative drive that is combined with the circuit of FIG. 10.

FIG. 18 details the second regenerative drive that is combined with the circuit of FIG. 10 and incorporated into regenerative drive 1600 in FIG. 16A. The circuit of FIG. 18 exists by itself as regenerative drive 1602 in FIG. 16B. A second power bridge 1807 of six additional MOSFETs in FIG. 18 are connected to the power bridge 1007 of FIG. 10 at terminals P+ and P− in both figures. The back-emf voltage 1800 for phase X is indicated and is π/6 radians (30 degrees) shifted relative to phase U. Similarly, phases Y and Z are shifted π/6 radians (30 degrees) relative to phases V and W. The phase conductors U, V, W, X, Y, Z are combined into a single winding as shown in FIG. 7B. In low power operation the MOSFETs associated with phases X, Y, and Z may be turned off to affect three-of-six operation. That is, only one of the two three-phase motor/alternators is used to reduce the switching loss that can be a large fraction of the regenerative drive loss at low power.

Figure 19:
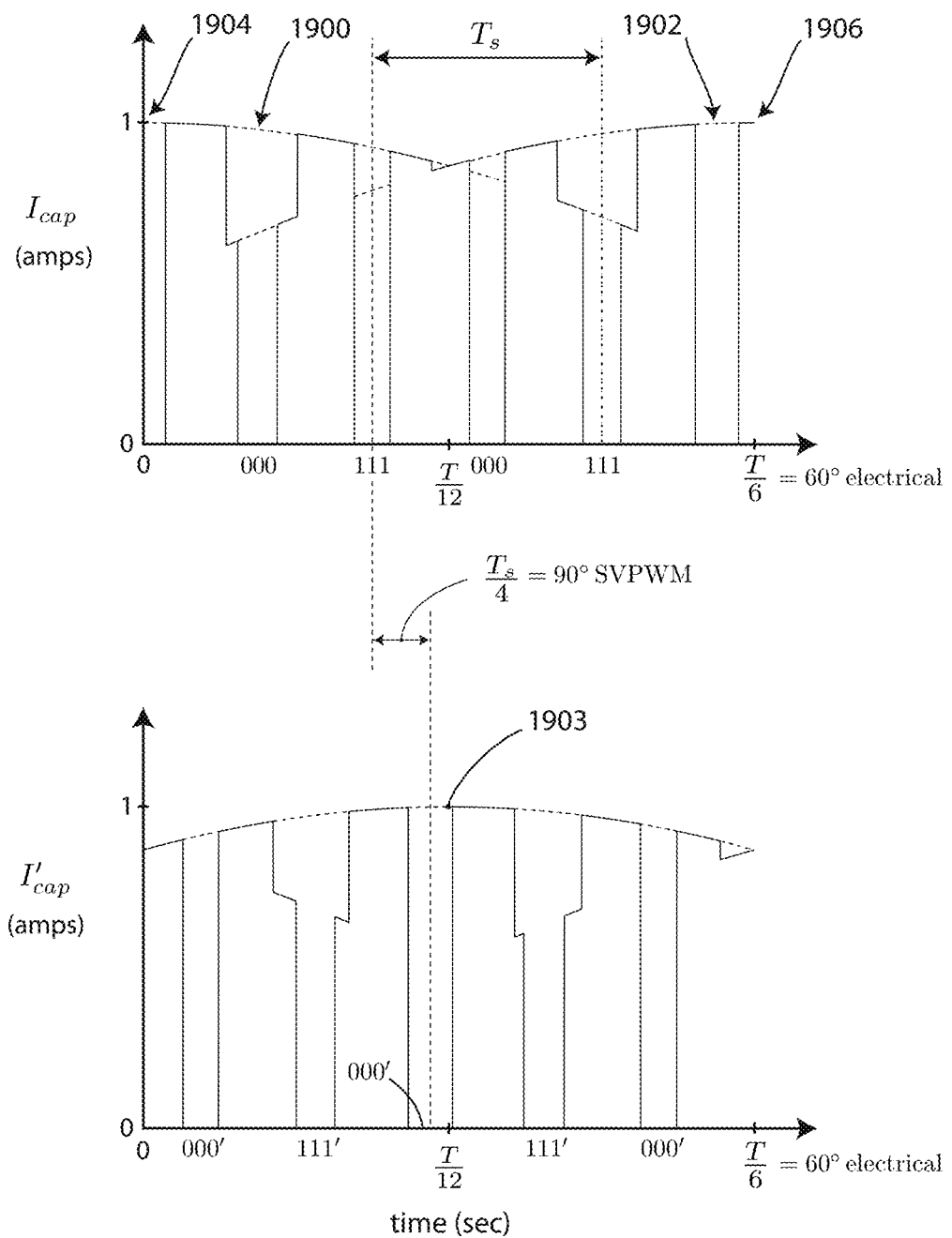
FIG. 19 is a graphical representation of current $I_{cap}$ in FIG. 10 and $I'_{cap}$ in FIG. 18 when the two power bridges are connected at terminals P+ and P−.

FIG. 19 depicts current $I_{cap}$ in FIG. 10 and $I'_{cap}$ in FIG. 18 when the two power bridges are connected at terminals P+ and P−. It is preferable that the two SVPWM modulation schemes are synchronized in such a way to partially cancel current ripple generated by the two groups of three phases. The synchronization of the two power bridges is shown in the relative position of the waveforms in the upper and lower panel of FIG. 19 and is referred to as "phase-synchronized SVPWM." The zero states of the two SVPWM schemes are shifted positive or negative $T_s/4$ seconds relative to each other. Thus, periods of high current in one waveform are aligned with periods of low current in the other. Hence, the current ripple stress on the bus capacitor is reduced and a smaller capacitance is required as well. The phase current waveforms cause features 1900, 1902, and 1903 in the current waveforms shown. Location 1904 corresponds to the peak in the phase U current, 1906 corresponds to the peak in the phase V current, and 1903 corresponds to the peak in the phase X current. The fact that the phase X peak is halfway between the phase U and phase V indicates a good distribution of the phase torques and more robust operation if one phase is lost due to a fault.

Figure 20:
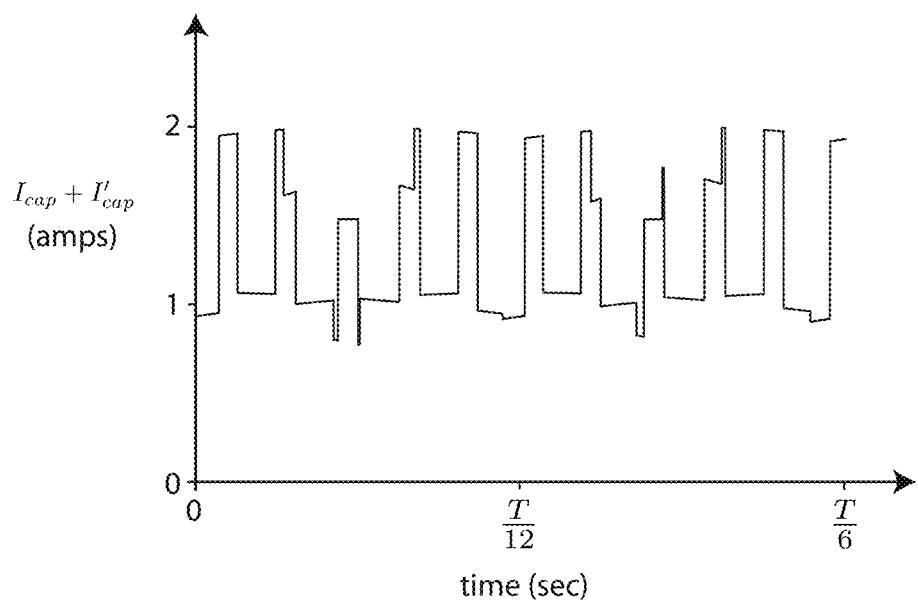
FIG. 20 is a graphical representation of the sum of the two waveforms of FIG. 19 and represents the current ripple experienced by the bus capacitor.

FIG. 20 depicts the sum of the two waveforms of FIG. 19 and represents the current ripple experienced by the bus capacitor. The rms ripple can be about one-half the ripple of unsynchronized systems in some operating conditions. This is beneficial because the current ripple rating of the bus capacitor is often one of the limiting design factors that sizes the capacitor. A reduced current ripple in the capacitor enhances reliability and reduces weight as it allows less stress and longer life for the capacitor, or a smaller and lighter capacitor to be used.

Figure 21A:
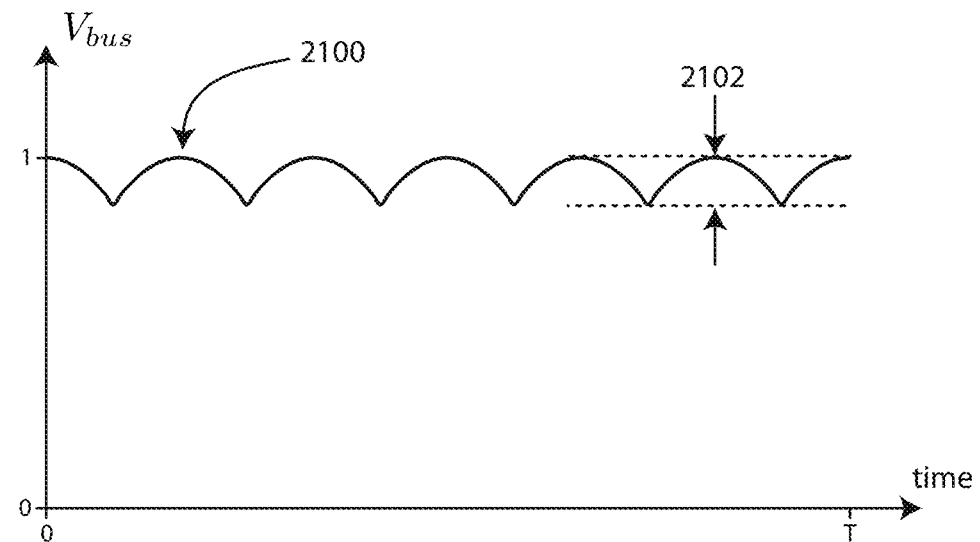
FIG. 21A is a graphical representation of the bus voltage ripple of an exemplary three-phase system in synchronous rectifier submode with the peak bus voltage normalized to 1.

FIG. 21A depicts the bus voltage ripple of an exemplary three-phase system in synchronous rectifier submode with the peak bus voltage normalized to 1. There are 6 pulses 2100 per electrical period T and the peak-to-peak voltage ripple 2102 is $$\left(1-\cos\left(\frac{\pi}{6}\right)\right)=0.134$$

times the peak bus voltage or 13.4%.

Figure 21B:
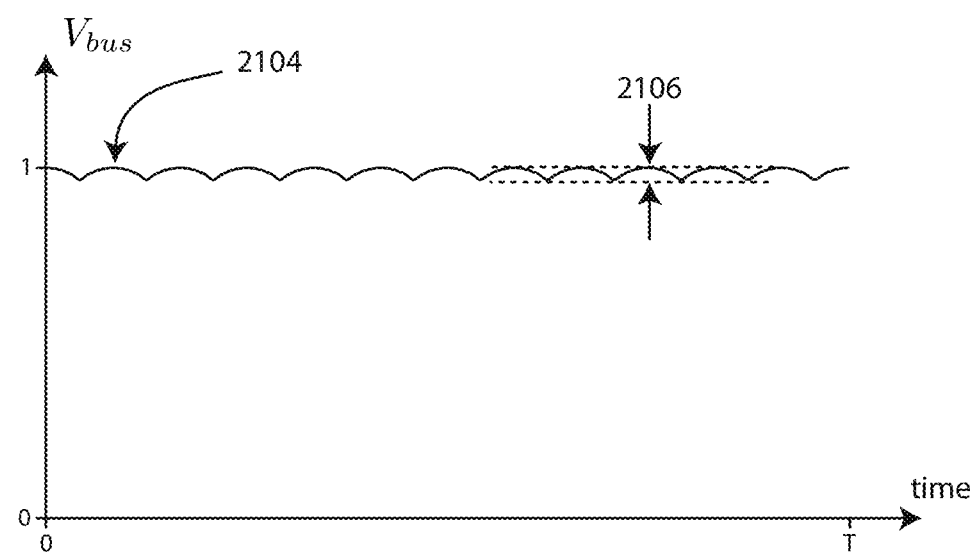
FIG. 21B is a graphical representation of an exemplary six-phase system in synchronous rectifier submode with the peak bus voltage normalized to 1.

FIG. 21B shows an exemplary six-phase system in synchronous rectifier submode with the peak bus voltage normalized to 1. There are 12 pulses 2104 per electrical period T and the peak-to-peak voltage ripple 2106 is $$\left(1-\cos\left(\frac{\pi}{12}\right)\right)=0.034$$

times the peak voltage or 3.4%. This is roughly ¼ the voltage ripple of the three-phase six-pulse system. This follows from the roughly parabolic shape of the phase sinusoid peaks. The six-phase system provides higher quality power in Synchronous Rectifier Mode and is used in the preferred embodiment. The waveforms in 21A and 21B are idealized for a purely resistive load but serve to convey the benefit of a six-phase motor/alternator.

Figure 22A:
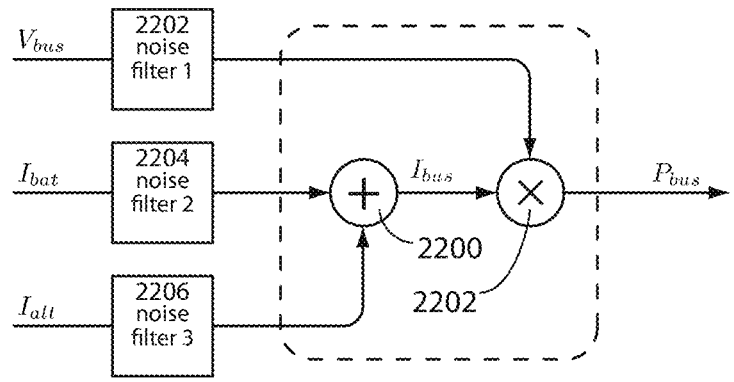
FIG. 22A is a block diagram of the bus power calculation used in system controller 318A for throttle control and battery charge control.

FIG. 22A shows a bus power calculation module used in system controller 318A for throttle control and battery charge control. The inputs to the bus power calculation are $V_{bus}$, $I_{bat}$, and $I_{alt}$ whose measurements have a level of noise depending on coupling of SVPWM switching noise, processor clock noise, ignition noise, commutation induced current and voltage ripple on the bus, and other noise sources. This noise is filtered by noise filter 1 2202, noise filter 2 2204, and noise filter 3 2206, respectively. These filters may be $1^{st}$ order low-pass filters and can also include notch filters tuned to specific frequency components in the noise. Tracking notch filters may also be included that are synchronized with noise sources since reference timing for such filters is available in the system. The filtered $I_{bat}$ and $I_{alt}$ signals are summed in summing node 2200 to produce the bus current $I_{bus}$ estimate that is then multiplied by the bus voltage $V_{bus}$ at multiplier node 2208 to produce a bus power signal $P_{bus}$.

Figure 22B:
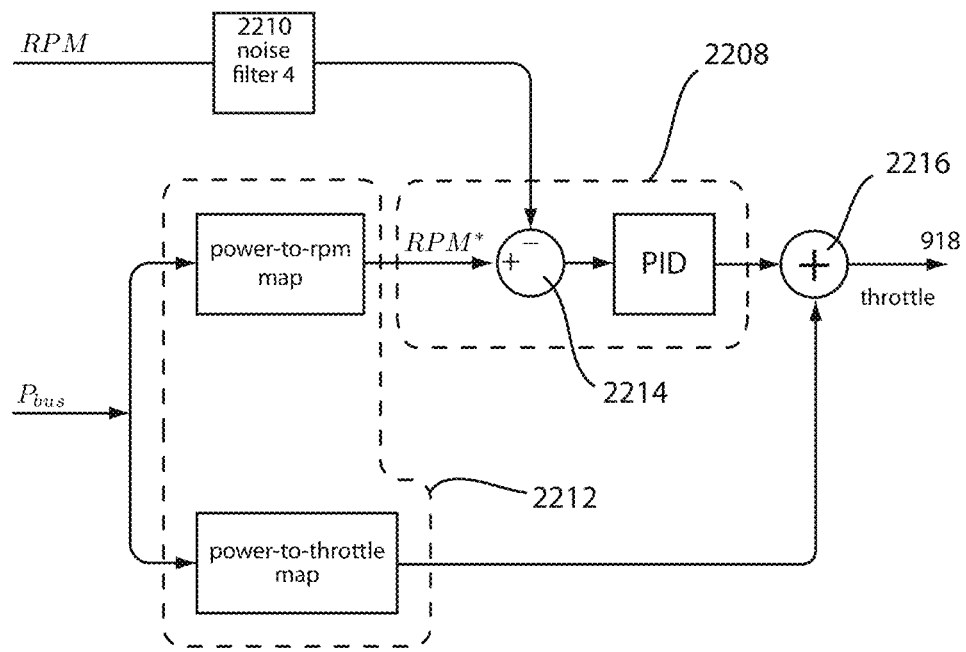
FIG. 22B is a block diagram of the prime mover throttle control system.

FIG. 22B depicts the prime mover throttle control system that resides in the system controller 318A and relies on inputs $P_{bus}$ and the engine RPM and is configured to provide the throttle command. The engine RPM is filtered with noise filter 4 2210 that can have any or all of the features of noise filters 1, 2, and 3. The throttle control system includes power-to-throttle feedforward subsystem 2212 configured to provide a feed forward signal and including at least one of a power-to-rpm map and a power-to-throttle map. These maps are based on engine dynamometer data that informs the control algorithm. The throttle and RPM operating points for maximum fuel economy for each power level are computed off-line and stored in the system controller 318A for use in the throttle control loop. (Note that in FIG. 3B the maximum fuel efficiency curve 350 coincides with the WOT curve above 5100 RPM and at and below the peak power point 370). This power feedforward minimizes fuel consumption and provides for responsive power production enhancing available power and range. Further, this approach to feedforward compensates for variations in bus voltage. The power-to-rpm map produces a commanded engine speed RPM* which is differenced with the actual RPM at the summing junction 2214. The difference, also called an error signal, is transmitted to a proportional-integral-derivative (PID) controller 2218. The output of the PID controller is summed with a power-to-throttle feedforward signal at summer 2 216 to produce the throttle command on connection 918 to the engine.

Figure 23:
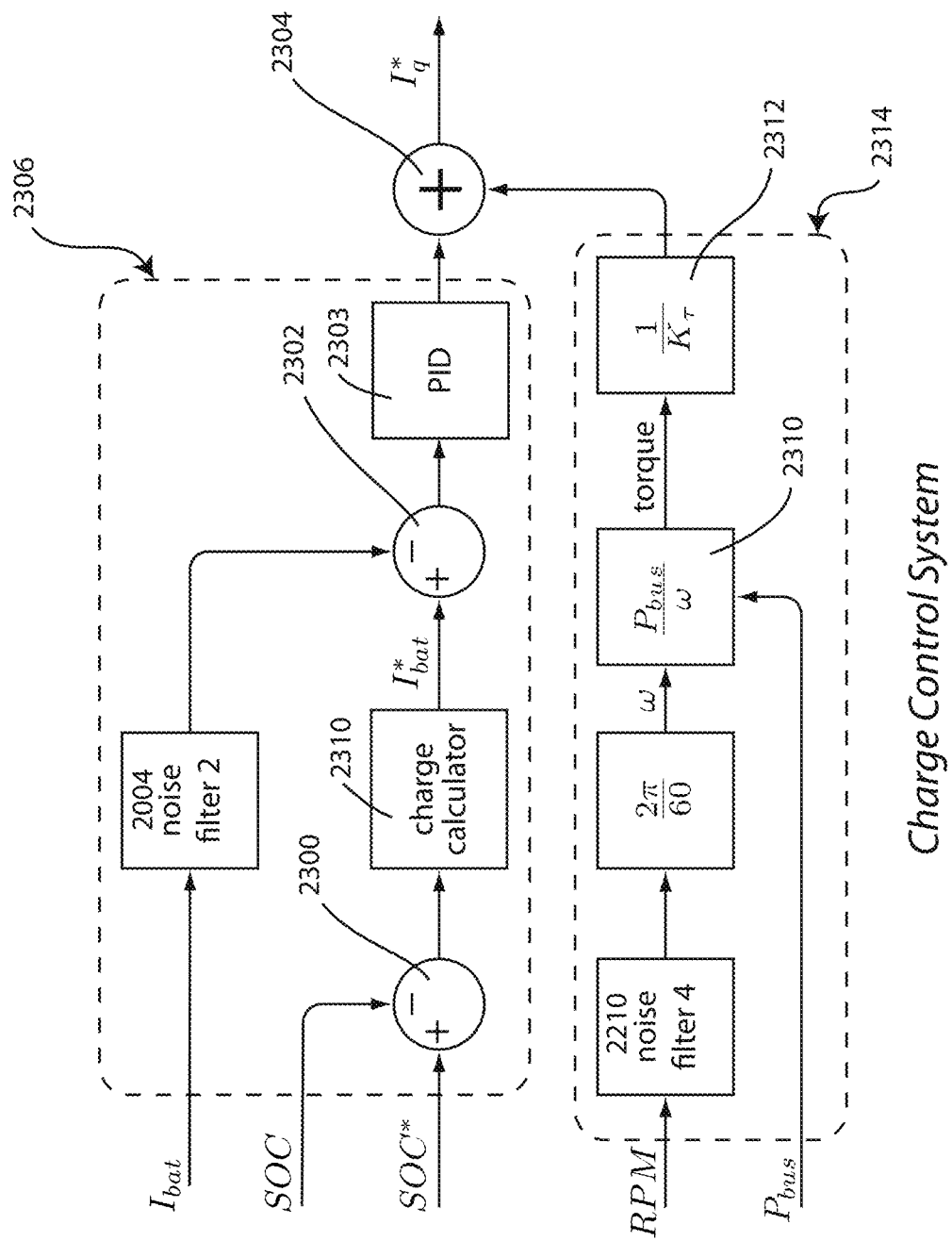
FIG. 23 is a block diagram of the charge control system that resides in the system controller.

FIG. 23 shows the charge control system that resides in the system controller 318A. The inputs to a current feedback to current subsystem 2306 are the battery current $I_{bat}$ filtered, which is then filtered by the same noise filter 2 2004 as shown in FIG. 22A and the state-of-charge (SOC) that are transmitted on connection 916 from the BMS 322. The system controller 318A is configured to adjust the regenerative drive current command $I*_q$ responsive to the SOC signal and an SOC setpoint. The SOC is filtered as needed by the BMS. Additional inputs are the state-of-charge setpoint SOC* that represents full charge, RPM, and $P_{bus}$. A current feedback to current subsystem 2306 is configured to provide a PID output. The SOC is differenced with the setpoint SOC* at differencing node 2300 in the current feedback to current subsystem 2306 and the error signal is transmitted to the charge calculator 2310 that computes a charge current setpoint $I*_{bat}$. $I_{bat}$, after filtering by Noise Filter 2, is compared to the setpoint $I*_{bat}$ at differencing node 2302 and the resulting error is the input to a PID controller 2303. The PID output from the current feedback to current subsystem 2306 is received in summer 2304 and summed with a power-to-current feedforward signal output from a power-to-current feedforward subsystem 2314 to produce the setpoint for the regenerative drive current command $I*_q$ for the regenerative drive electronics. It is understood that $I*_q$ affects the motor/alternator phase currents, which, in turn, affect the value $I_{alt}$. The power-to-current feedforward subsystem 2314 is configured to provide a current command and power-to-current feedforward is accomplished in by converting the RPM signal filtered through noise filter 4 2210 to the angular velocity ω having units of radians/sec. The required torque is computed using the $P_{bus}$ input in module 2310 and module 2312 converts this to a current command via the motor/alternator torque constant $K_\tau$. The appropriate units for the torque constant in this figure are (Newton-meters)/(amps peak).

In an alternative embodiment the SOC and SOC* differencing and the charge algorithm may be implemented in the BMS 322, and then the BMS sends the signal to the system controller 318A. The algorithm functions the same as described above, but certain parts of the functionality can be moved into different subsystems for convenience. In this case, as different battery packs are swapped in and out of the vehicle, the charge algorithm may be different due to cell aging or different cell characteristics in different packs. Then having the charge algorithm in the BMS that is mounted within the battery pack ensures that the system will charge each different pack that may be swapped in appropriately for that particular battery pack.

Figure 24:
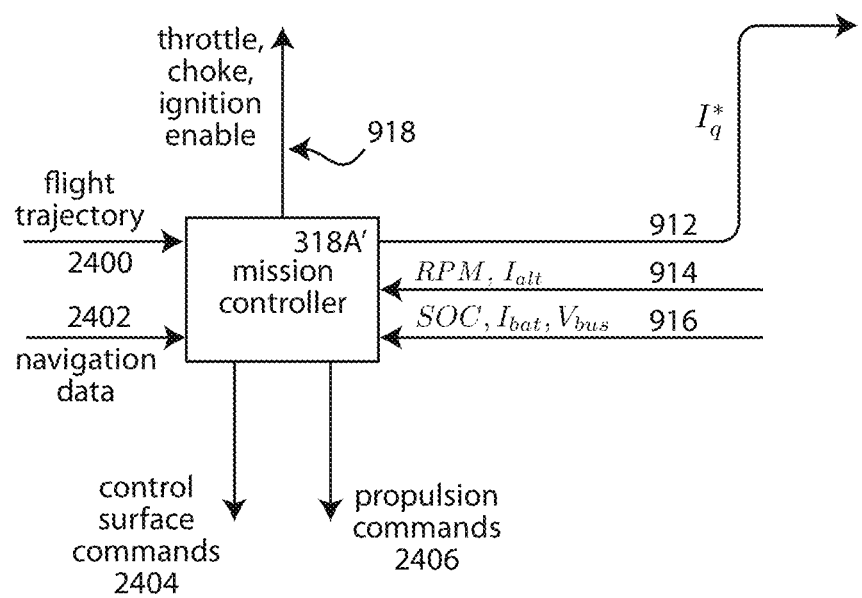
FIG. 24 is a block diagram of the mission controller with inputs and outputs.

The system controller 318A can be replaced with a mission controller 318A' as shown in FIG. 24. The mission controller provides the output signals 912 and 918 that the system controller provides. In addition, the mission controller 318A' provides control surface commands 2404 (for example to ailerons, rudder, elevators, and flaps) and propulsion commands 2406 (for example to propellers and lift rotors). The mission controller uses inputs 914 and 916 like the system controller, but also accepts the flight trajectory 2400 and navigation data 2402 as inputs. The flight trajectory can be longitude, latitude, and elevation as a function of time or control signals from a pilot. The navigation data are longitude, latitude, heading, and elevation from, for example, a GPS system or an inertial navigation system. The mission controller optimizes its control outputs to maximize the mission performance. The performance is a combination of fuel efficiency, engine wear, noise levels and other measures as determined by the specific mission. For example, when operating for maximum fuel efficiency, the engine will be controlled to operate near the peak fuel efficiency point 360. During take-off for a vertical take-off-and-landing (VTOL) vehicle, the mission controller may operate the ICE at the peak power point 370 and switch the alternator submode to synchronous rectifier submode. More generally, a mission may be optimized with operation switching between the ICE being off, the ICE operating at the peak fuel efficiency point 360, the ICE operating along the peak fuel efficiency curve 350 and operating at wide-open-throttle near the peak power point 370. When the power required is below that of the peak fuel efficiency point, the ICE will switch back and forth between the being off and the peak fuel efficiency point, and the battery provides the mechanism for averaging the output power to the required level. For example, the amount of time spent at the maximum-fuel-efficiency Note also that the mission controller 318A' or the system controller 318A can command the system to operate in electric only mode when there are specific mission constraints. In this mode the prime mover engine 300 may be shut down entirely to reduce noise or thermal signature and the vehicle can operate as a pure electric vehicle under battery power only. In this mode all the engine control and regenerative control algorithms are disabled. When the mission controller/system controller commands return to hybrid-electric powered flight, a command from the system controller 318A initiates a starting sequence. In the starting sequence the system controller uses power from the battery 320 through the regenerative drive to create motoring torque in the motor/alternator while also enabling the ignition and fueling systems in the prime mover 300. Once the system controller detects that the prime mover has started and is creating torque and is accelerating rotational speed it will remove the motor-alternator torque, initialize and start the current and speed control loops, and then enter the previously described SVPWM or Synchronous Rectification control modes.

In summary, the disclosed implementation discussed demonstrate how it provides lightweight, high-efficiency, energy-dense, hybrid power systems for reliable electric flight through various combinations of elements in conjunction with a dual-Halbach-array axial-gap ironless motor/alternator. The ironless motor/alternators provide low inductance and improved efficiencies relative to iron-core motors. When working as an alternator, this means the output voltage is insensitive to current and power quality is improved. When working as a motor, the low inductance means that high torques can be achieved at lower bus voltages. The benefits of low inductance are also quantified as a power factor near unity, which has the benefits mentioned above as well as others known in the art.

This axial-gap motor/alternator configuration provides a compact mechanical configuration when combined with a prime mover—an internal combustion engine or gas turbine in accordance with the teachings of the disclosed implementation. This compact configuration reduces weight and improves vibration performance as the motor/alternator shaft length is shorter. A short shaft can be made stiffer, which avoids rotodynamic issues associated with flexible shafts and rotor structural resonances.

The largely planar structure of the rotors can be made very robust to the torsional impulse loading from a piston engine power stroke without adding significant structural mass to the rotor. This type of motor/alternator also naturally pumps cooling air over its winding so that additional cooling systems are not required—weight is thus reduced, and reliability is improved. The large diameter and short machine has a large inertia compared to more conventional machines of the same power and torque rating, this high inertia is advantageous as the internal combustion engine requires a certain amount of inertia to overcome the compression stroke, and the use of the axial gap machine acts as a flywheel on the engine, saving additional system mass.

Dual Halbach arrays provide high magnetic fields in the motor/alternator and improve efficiency and power density. The systems can be designed with many small magnetic poles, which reduces the mass of the motor/alternator due to the thin magnetic cross section achievable with many small poles. The system then operates at a high electrical frequency, which is inefficient for conventional prior art motor/alternators due to iron losses and reactive voltage. The ironless motor/alternator has no iron and hence no iron loss penalty at high electrical frequency.

Additional safety and reliability is provided by the preferred serpentine winding in the axial-gap polyphase motor/alternator. This form of winding does not overlap itself and it is nearly impossible for it to incur a self-short (aka turn-to-turn short) in a single phase. These windings are preferably made from litz wire that reduces unwanted eddy-currents in the windings.

Because serpentine winding can experience phase-to-phase shorts the disclosed implementation enhances safety by including a fused at a wye connection so that the shorted phases are disabled. Additionally, a 4-leg wye connection can be utilized where a 3-phase electrical system has 3 phase terminal legs and an additional $4^{th}$ neutral terminal leg where the three phase windings come together to form the wye. Current need not flow in the neutral unless there is a winding or drive fault on one of the phases. In the faulted case, the neutral connection provides a return current path and continued operation.

Optimal fail-operational commutation (OFOC) is provided for a motor with sinusoidal back-emf waveforms, the maximum efficiency commutation currents in the phases are sinusoidal currents that are in-phase with the back-emf voltage. For an alternator, the currents are exactly out-of-phase. If one or more windings is lost, the commutation currents that provide a constant commanded torque with maximum efficiency necessarily change. The OFOC provides the unique maximum efficiency phase currents for sinusoidal and non-sinusoidal back-emf waveforms.

Further, the exemplary six-phase configuration provides redundancy, reliability and reduced bus voltage ripple and bus current ripple when a bridge rectifier or synchronous rectifier is used. The six-phase motor/alternator drive can be configured as a single power converter unit or as two three-phase regenerative power converter drives powering a six-phase motor/alternator comprised of two three-phase wye windings. In addition to improved performance, this embodiment exploits more standard and lower cost three-phase regenerative drives. The two three-phase systems can also be configured as 4-leg wye systems.

In a six-phase motor/alternator comprised of two integrated three-phase motor/alternators it is sometimes desirable to turn off one of the motor/alternators by switching off all of the MOSFETs associated with that motor/alternator to achieve three-of-six operation. When turning MOSFETs on and off, there is power required to charge and discharge the MOSFET gate capacitances and other "fixed overhead" power requirements that are unrelated to the amount of current switched by the MOSFET. Thus, at low currents, the fixed overhead can become a relatively large fraction of the regenerative drive loss and overall efficiency can be improved by using only three of the six available phases. Extensions of this idea apply to any polyphase motor where a reduced number of phases can be driven.

Moreover, in the six-phase motor/alternator, the two three-phase motor/alternators sections are driven by two space-vector pulse-width-modulated (SVPWM) drives that are phase synchronized to reduce the current stress on the bus capacitor, the required bus capacitance, and ripple in the regenerative drive bus voltage and current.

When the motor/alternator is used in alternator mode, there are two submodes:

a. a submode where the regenerative drive boosts the phase voltages up to the bus voltage. This is identified herein as PWM Submode (or SVPWM submode with specific space vector PWM implementation). It is understood that various PWM schemes can be used. In this mode the prime mover speed can be adjusted to the speed that produces the required DC Bus power at the best fuel consumption rate. This mode would typically be used for part power operating modes as piston engines typically achieve best fuel consumption at about 50% of peak power and 50% of the peak power speed. In this mode the thermal losses in the regenerative drive are roughly equally split between conduction losses and PWM switching losses, so the thermal management system mass is driven by both loss mechanisms combined.

b. a submode where the regenerative drive works as a synchronous rectifier. At higher prime mover speeds, the peak phase-to-phase alternator voltages reach and slightly exceeds the DC bus voltage and the PWM boost is not needed. By switching to synchronous rectification, switching losses are reduced and efficiency increases for the power converter electronics. Further, the thermal management requirements and weight for the power electronics is reduced relative to the maximum power processed. However, the prime mover speed must be closely regulated at a fixed speed related to the DC Bus voltage and DC bus power, so there is no flexibility to change prime mover speed to optimize prime mover fuel consumption. This mode would typically be used for full power operation as prime movers typically achieve maximum power near maximum rotational speed. This is called Synchronous Rectifier Submode.

In the well-known dq-coordinates used in motor/alternator control, the d current affect the q voltage and visa verse. These effects increase with speed and can cause instability and failure of the motor/alternator current control. This cross-coupling effect is canceled in the disclosed implementation in the current control loop and provides for better system reliability.

The response time of the prime mover internal combustion engine to electrical demand on the power bus is improved with the innovative control scheme of the disclosed implementation. A near-instantaneous reaction to the bus power is affected in the RPM set-point and the throttle set-point. This control technique uses dynamometer data to intelligently compute the RPM and throttle commands. It is understood that either or both RPM set-point and throttle set-point information may be used in an embodiment of this invention.

Lastly, the use of a mission controller provides a systematic way to formulate and solve for the best ICE speed and power time profiles during a mission. Range can be optimized, noise minimized for certain period, or peak power provided during take-off or other periods of time to meet the mission requirements.

Having now described various implementations in detail as required by the patent statutes, those skilled in the art will recognize modifications and substitutions to the specific implementations disclosed herein. Such modifications are within the scope and intent of the following claims. Within the specification and the claims, the terms "comprising", "incorporate", "incorporates" or "incorporating", "include", "includes" or "including", "has", "have" or "having", and "contain", "contains" or "containing" are intended to be open recitations and additional or equivalent elements may be present. The term "substantially" as used within the specification and claims means that the recited characteristic, parameter, or value need not be achieved exactly, but that deviations or variations, including for example, tolerances, measurement error, measurement accuracy limitations and other factors known to those skilled in the art, may occur in amounts that do not preclude the effect the characteristic was intended to provide.

The invention claimed is:

1. A hybrid power system for electric aircraft comprising:
a prime mover;
a self-cooling polyphase axial-flux dual-Halbach-array motor/alternator with $N_{phase}$ phases connected to the prime mover;
a polyphase regenerative drive with $N_{phase}$ phases connected to the self-cooling polyphase axial-flux dual-Halbach-array motor/alternator and a DC power bus;
a battery connected to the DC power bus;
a battery management system operably connected to the battery; and
a system controller operably connected to the prime mover, the polyphase regenerative drive and the battery management system.

2. The hybrid power system of claim 1 wherein the prime mover is an internal combustion engine (ICE) or a gas turbine connected to the motor generator with an engine shaft and said system controller is connected to provide at least a throttle command to the prime mover.

3. The hybrid power system of claim 1 wherein $N_{phase}$ is greater than or equal to 3.

4. The hybrid power system of claim 1 wherein $N_{phase}$ is 6.

5. The hybrid power system of claim 2 wherein the system controller is configured to issue a regenerative drive current command $I^*_q$ and the motor/alternator has $N_{phase}$ terminals and a neutral point, and the regenerative drive comprises:
a processor receiving the regenerative current command and configured to responsively command a plurality of binary gate voltage signals; and
a semiconductor switch power bridge having a plurality of semiconductor switches responsive to the plurality of binary gate voltage signals connected in complimentary pairs across an isolated DC bus with each complimentary pair connected to a common phase terminal of the motor/alternator.

6. The hybrid power system of claim 5 wherein the processor further comprises a controller configured to provide the plurality of binary gate voltage signals in a selected one of a Pulse-Width Modulation (PWM) submode, a Synchronous Rectification submode or a motor mode.

7. The hybrid power system of claim 6 wherein the controller comprises:
a Clark transformation module receiving phase currents from the motor/alternator and configured to provide a phase current $(I_\alpha \; I_\beta)^T$ output;
a Park transformation module receiving the $(I_\alpha \; I_\beta)^T$ output and configured to provide a motor/alternator current $(I_d \; I_q)^T$ output;
a current controller receiving the motor/alternator current $(I_d \; I_q)^T$ output and the current command, said current controller configured to provide a voltage $(V_d \; V_q)^T$ output responsive to the current command;
an inverse Park transformation module receiving the voltage $(V_d \; V_q)^T$ output and configured to provide a modified voltage output vector $(V_\alpha \; V_\beta)^T$; and,
a PWM timing module receiving the modified voltage output vector $(V_\alpha \; V_\beta)^T$ and configured to provide the plurality of binary gate voltage signals to the semiconductor switch Power bridge operable in the PWM submode.

8. The hybrid power system of claim 6 wherein the controller further comprises a synchronous rectification timing module selectively connectable to the semiconductor switch power bridge, said synchronous rectification timing module configured to provide the plurality of binary gate voltage signals to the semiconductor switch power bridge whereby the semiconductor switch power bridge responds as a bridge rectifier operable in the synchronous rectification submode.

9. The hybrid power system of claim 2 where the motor/alternator has a generator constant whereby a rotational speed of the engine shaft at which peak phase-to-phase voltages equal a bus voltage corresponds to 100% to 115% of the speed at a peak engine power point.

10. The hybrid power system of claim 9 wherein a motor/alternator output voltage varies less than +15% from the bus voltage when the rotational speed of the engine shaft is at the peak engine power point.

11. The hybrid power system of claim 5 wherein $N_{phase}$ is equal to 3 and the motor/alternator is wye-connected with a neutral point and further comprising a half bridge connected to the DC bus in parallel with the semiconductor switch power bridge and to the neutral point.

12. The hybrid power system of claim 1 wherein $N_{phase}$ is equal to 6 and the polyphase regenerative drive comprises a first 3-phase regenerative drive connected to the DC bus and a second 3-phase regenerative drive connected to the DC bus.

13. The hybrid power system of claim 1 wherein $N_{phase}$ is equal to 5 and the polyphase regenerative drive comprises five single phase regenerative drives connected to the DC bus.

14. The hybrid power system of claim 2 wherein the prime mover is a piston engine ICE having a crankshaft axially connected to the engine shaft and the motor/alternator comprises:
 a front motor rotor supporting front rotor magnets forming a Halbach array; and
 a rear motor rotor supporting rear motor magnets forming a second Halbach array;
 wherein said front motor rotor and rear motor rotor extend radially from the engine shaft to act as a flywheel.

15. The hybrid power system of claim 14 wherein the front motor rotor and rear motor rotor are rotationally supported by bearings engaged to the crankshaft.

16. The hybrid power system of claim 5 wherein the battery management system is configured to provide a state-of-charge (SOC) signal to the system controller and said system controller is configured to adjust the regenerative drive current command $I^*_q$ responsive to the SOC signal and an SOC setpoint.

17. The hybrid power system of claim 16 wherein the system controller further comprises:
 a current feedback to current subsystem receiving a battery current, the SOC signal and the SOC setpoint, said current feedback to current subsystem configured to provide a PID output;
 a power-to-current feedforward subsystem receiving an RPM signal and a bus power $P_{bus}$ signal and configured to provide a current command; and
 a summer receiving the PID output and the current command and configured to provide the regenerative drive current command $I^*_q$.

18. The hybrid power system of claim 5 wherein the system controller is configured to issue a throttle signal to the ICE responsive to a bus power $P_{bus}$ signal and an RPM signal.

19. The hybrid power system of claim of claim 18 wherein the system controller further comprises a throttle control system module receiving the $P_{bus}$ signal and the RPM signal and configured to provide the throttle command.

20. The hybrid power system of claim 2 wherein the system controller comprises a mission controller, said mission controller receiving a flight trajectory input and a navigation data input and issuing the throttle command responsive to the flight trajectory input.

* * * * *